US012561936B2

(12) United States Patent
    Vianello et al.

(10) Patent No.: US 12,561,936 B2
(45) Date of Patent: Feb. 24, 2026

(54) SYSTEM AND METHOD FOR OCCLUSION CORRECTION

(71) Applicant: Cape Analytics, Inc., Palo Alto, CA (US)

(72) Inventors: Giacomo Vianello, Palo Alto, CA (US); Peter Lorenzen, Palo Alto, CA (US)

(73) Assignee: Cape Analytics, Inc., Palo Alto, CA (US)

( * ) Notice: Subject to any disclaimer, the term of this patent is extended or adjusted under 35 U.S.C. 154(b) by 414 days.

(21) Appl. No.: 18/121,114

(22) Filed: Mar. 14, 2023

(65) Prior Publication Data

US 2023/0222758 A1     Jul. 13, 2023

Related U.S. Application Data

(62) Division of application No. 17/870,279, filed on Jul. 21, 2022, now Pat. No. 11,631,235.

(60) Provisional application No. 63/224,619, filed on Jul. 22, 2021.

(51) Int. Cl.
    *G06V 10/00*        (2022.01)
    *G06Q 30/02*        (2023.01)
    *G06T 7/11*         (2017.01)
    *G06T 7/60*         (2017.01)
    *G06V 10/26*        (2022.01)

(52) U.S. Cl.
    CPC ....... *G06V 10/273* (2022.01); *G06Q 30/0278* (2013.01); *G06T 7/11* (2017.01); *G06T 7/60* (2013.01); *G06T 2200/04* (2013.01)

(58) Field of Classification Search
    CPC ....... G06T 5/005; G06T 7/11; G06T 2200/04; G06T 11/40; G06V 10/273; G06V 20/176
    See application file for complete search history.

(56) References Cited

U.S. PATENT DOCUMENTS

| | | | |
|---|---|---|---|
| 9,911,042 B1 | 3/2018 | Cardona et al. | |
| 10,467,476 B1 | 11/2019 | Cardona et al. | |
| 11,367,265 B2 | 6/2022 | Manello et al. | |
| 11,557,059 B2 | 1/2023 | Sameer | |
| 11,631,235 B2 | 4/2023 | Manello et al. | |
| 11,816,747 B1 | 11/2023 | Buentello et al. | |
| 2010/0161498 A1 | 6/2010 | Walker et al. | |
| 2010/0217566 A1 | 8/2010 | Wayne et al. | |
| 2013/0054476 A1 | 2/2013 | Whelan | |
| 2013/0238512 A1 | 9/2013 | Treadwell et al. | |
| 2015/0088886 A1 | 3/2015 | Brouwer et al. | |
| 2016/0314545 A1 | 10/2016 | Jessen | |
| 2017/0076365 A1 | 3/2017 | D'souza et al. | |

(Continued)

OTHER PUBLICATIONS

"Geospatial Property Analytics: Supercharging AVMs for SFR Investing", Cape Analytics, downloaded Oct. 3, 2022, https://capeanalytics.com/blog/geospatial-property-analytics-avm-sfr-investing/.

(Continued)

*Primary Examiner* — Li Liu
(74) *Attorney, Agent, or Firm* — Polsinelli PC

(57) ABSTRACT

In variants, the method for occlusion correction can include: determining a measurement depicting an occluded object of interest (OOI), optionally infilling the occluded portion of the object of interest within the measurement, and determining an attribute of the object of interest based on the infilled measurement.

5 Claims, 12 Drawing Sheets

(56)　　　　References Cited

U.S. PATENT DOCUMENTS

| | | |
|---|---|---|
| 2017/0076438 A1 | 3/2017 | Kottenstette et al. |
| 2019/0294647 A1 | 9/2019 | Brouwer et al. |
| 2020/0082168 A1 | 3/2020 | Fathi et al. |
| 2020/0160030 A1 | 5/2020 | Lavi |
| 2020/0226373 A1 | 7/2020 | Kottenstette et al. |
| 2020/0302644 A1 | 9/2020 | Sameer |
| 2021/0065340 A1 | 3/2021 | El-Khamy et al. |
| 2021/0073930 A1 | 3/2021 | Khoshbin |
| 2021/0133936 A1 | 5/2021 | Chandra et al. |
| 2021/0142123 A1 | 5/2021 | Okazaki |
| 2021/0182529 A1 | 6/2021 | Singh et al. |
| 2021/0199446 A1 | 7/2021 | Marschner et al. |
| 2021/0279824 A1 | 9/2021 | Choi et al. |
| 2021/0312710 A1 | 10/2021 | Fathi et al. |
| 2021/0357642 A1 | 11/2021 | Stroud et al. |
| 2022/0229946 A1* | 7/2022 | Justus .................. G06V 10/422 |
| 2022/0292650 A1 | 9/2022 | Amirghodsi et al. |
| 2022/0405856 A1 | 12/2022 | Hedges et al. |
| 2023/0011777 A1 | 1/2023 | Brown et al. |
| 2023/0119132 A1 | 4/2023 | Cebulski et al. |
| 2023/0237775 A1 | 7/2023 | Portail |
| 2023/0385882 A1 | 11/2023 | Lee et al. |

OTHER PUBLICATIONS

"ValPro+—Cape Analytics", Cape Analytics, https://web.archive.org/web/20210301122341/https://capeanalytics.com/valpro/, downloaded Oct. 3, 2022.

"Weiss Analytics Launches ValPro+, First AVM Powered By Cape Analytics' Instant Property Condition Assessments", Cape Analytics, Feb. 19, 2021, https://capeanalytics.com/resources/weiss-analytics-valpro-instant-property-condition-assessments/.

Ambrosch, Philipp , et al., "System and Method for Property Group Analysis", U.S. Appl. No. 18/333,803, filed Jun. 13, 2023.

Cebulski, Sarah , et al., "System and Method for Property Analysis", U.S. Appl. No. 18/303,990, filed Apr. 20, 2023.

"HOA Lookup City of Goodyear GIS", https://www.arcgis.com/apps/webappviewer/index.html?id=816ddfbd119e49d4a74bb30cb4592c22, first downloaded May 31, 2023.

Zheng, Chuanxia , et al., "Pluralistic Image Completion", arXiv:1903.04227v2. Apr. 5, 2019.

* cited by examiner

SYSTEM AND METHOD FOR OCCLUSION CORRECTION

CROSS-REFERENCE TO RELATED APPLICATIONS

This application is a divisional of U.S. application Ser. No. 17/870,279 filed 21 Jul. 2022 which claims the benefit of U.S. Provisional Application No. 63/224,619 filed on 22 Jul. 2021, which is incorporated herein in its entirety by this reference.

TECHNICAL FIELD

This invention relates generally to the computer vision field, and more specifically to a new and useful method for occlusion correction.

BACKGROUND

Accurate property measurements and attribute values can be highly valuable for property analyses. Measurements for structures, however, can be inaccurate when the objects of interest, such as the primary building, are occluded. For example, a surface area roof measurement can be less accurate when the roof is occluded by a tree because part of the roof is not visible in the measurement.

Thus, there is a need for a new and useful system and method for measurement occlusion correction.

DESCRIPTION OF THE PREFERRED EMBODIMENTS

The following description of the preferred embodiments of the invention is not intended to limit the invention to these preferred embodiments, but rather to enable any person skilled in the art to make and use this invention.

1. OVERVIEW

Figure 1:
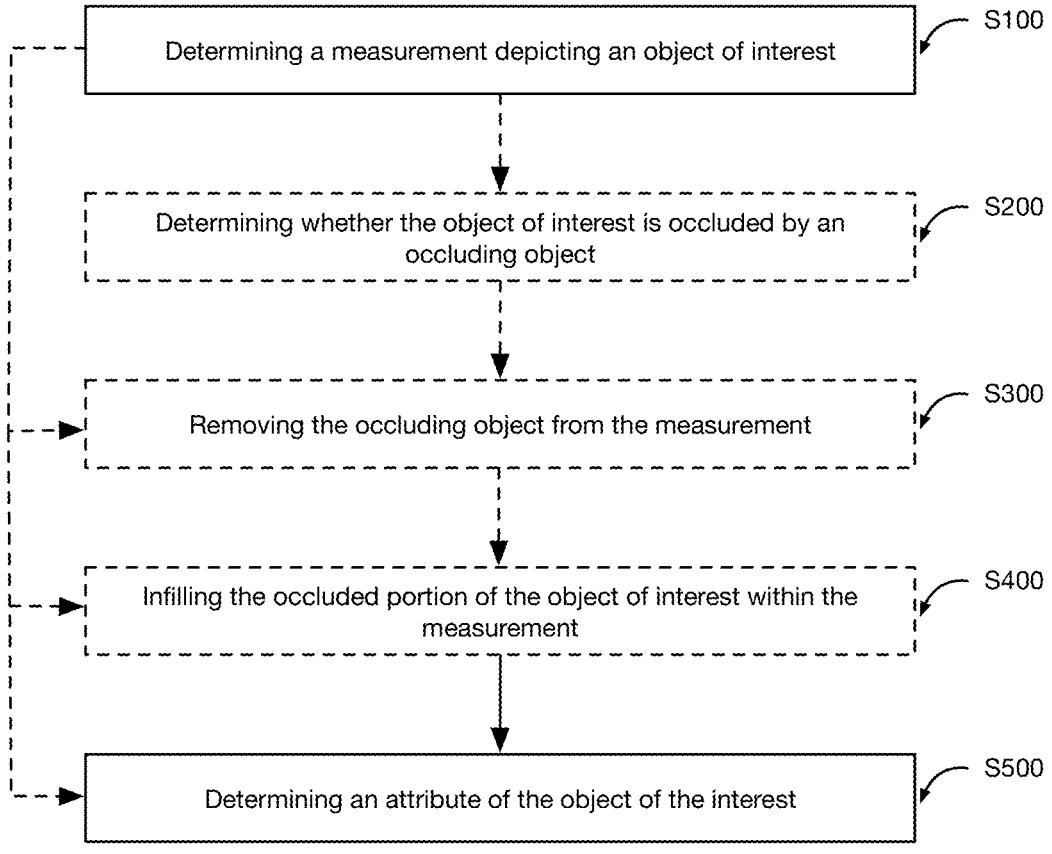
FIG. 1 is a schematic representation of a variant of the method.

As shown in FIG. 1, variants of the method can include: determining a measurement depicting an object of interest (OOI) S100, optionally determining whether the object of interest is occluded by an occluding object S200, optionally removing the occluding object from the measurement S300, optionally infilling the occluded portion of the object of interest within the measurement S400, and determining an attribute of the object of interest S500. However, the method can additionally and/or alternatively include any other suitable elements. In variants, the method can function to fill in the occluded portions of occluded objects of interest (OOIs) that are depicted in property measurements, which can be used to determine more accurate attributes for the occluded OOIs.

2. EXAMPLES

Figure 4:
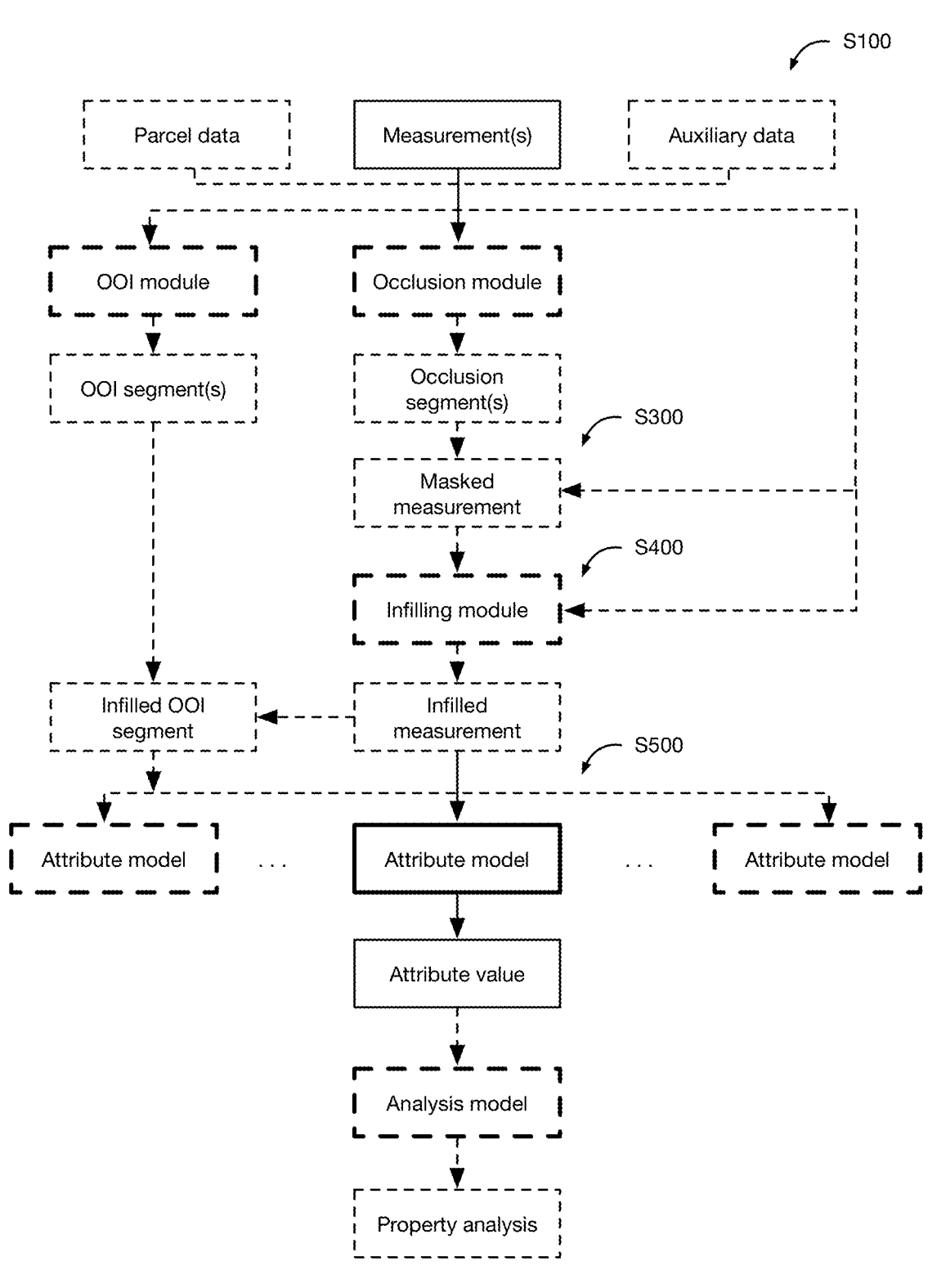
FIG. 4 is a schematic representation of a variant of the method.
Figure 5:
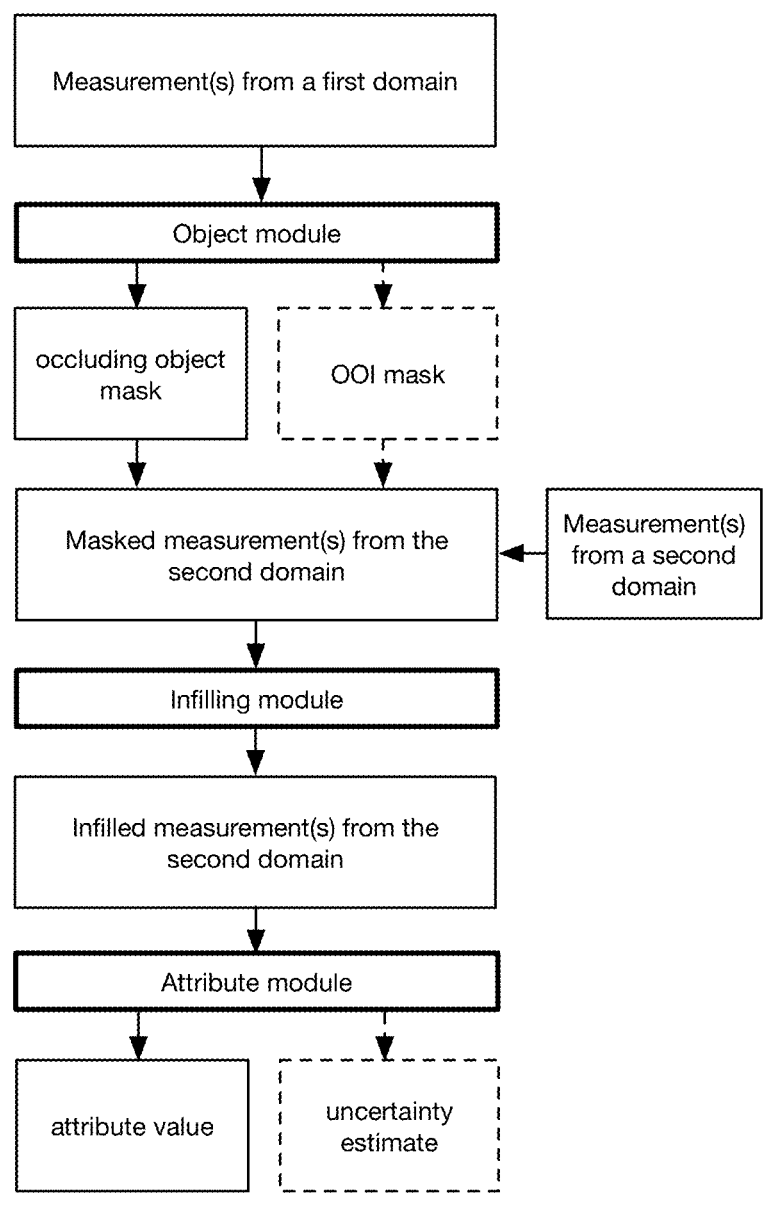
FIG. 5 is a schematic representation of a variant of the method.

In examples, the method can include: obtaining one or more measurements (e.g., RGB image, DSM, etc.) depicting an object of interest (OOI) on one or more properties; infilling an occluded region of the OOI using an infilling model (e.g., a generative model trained to infill the OOI, a generative model using a template-based approach to infill the OOI, etc.); determining a set of attribute values of the OOI using the infilled measurement; and optionally determining a property analysis based on the attribute values (e.g., example shown in FIG. 4). The measurements being infilled can have occlusions removed (e.g., wherein occlusions can be identified and masked out) or have occlusions intact. In an illustrative example, a measurement from a first domain, such as an appearance-based measurement (e.g., RGB image, 2D image, etc.) can be used to identify an occlusion mask (e.g., vegetation mask), which is used to mask out the occlusions in a measurement from the same or different domain, such as a geometric measurement (e.g., 3D image, DSM, etc.) prior to infilling the measurement from the second domain (e.g., example shown in FIG. 5).

However, the method can be otherwise performed.

3. Technical Advantages

Variants of the technology can confer several benefits over conventional systems and methods.

First, variants of the technology can enable more accurate OOI attribute estimation and/or more accurate OOI extraction by automatically infilling the occluded regions of an object of interest within a property measurement. This can produce a more accurate depiction of the object of interest, thereby resulting in more accurate OOI segment and/or attribute extraction.

Second, variants of the technology can enable computational savings by incorporating an occlusion module that determines whether an OOI is occluded. In these variants, when the OOI is not occluded, the method can bypass the occlusion correction processes and directly extract property attributes and/or components from the original measurement (e.g., 3D image).

Third, variants of the technology can increase infilling accuracy and/or reduce the infilling model training burden by identifying and removing occlusions from the measurement prior to infilling, such that the infilling model does not need to identify (or be trained to identify) the occluded regions in addition to identifying the OOI and infilling said occluded regions. For example, an appearance-based measurement can be used to identify the occluded regions, which can then be masked out of a geometric measurement that is subsequently infilled. Alternatively, the measurements can be directly infilled without prior occlusion removal.

Fourth, variants of the technology can increase infilling accuracy by providing auxiliary information, such as parcel data for the property, to the infilling model. For example, the infilling model can use the parcel data to limit the extent of possible roof infilling when an overhanging tree spans both the property's parcel and an adjoining parcel. In another example, the infilling model can be conditioned using text descriptions of the OOI to guide the extent and/or type of infilling.

However, the technology can confer any other suitable benefits.

4. System

Figure 2:
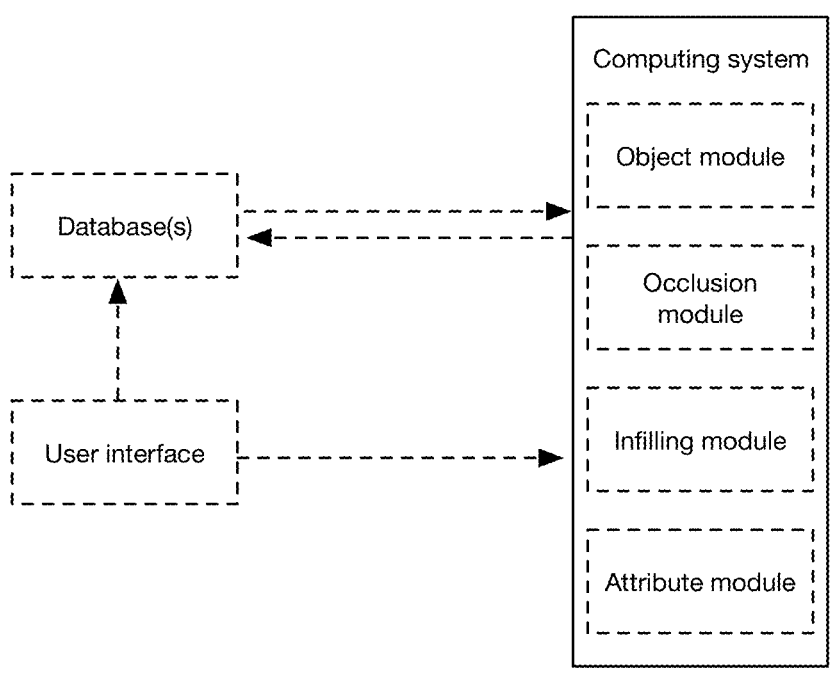
FIG. 2 is a schematic representation of a variant of the system.

As shown in FIG. 2, The system can include one or more infilling modules, and can optionally include one or more: attribute modules, occlusion modules, object modules (e.g., object detectors), and/or any other set of models.

The system can function to infill objects of interest (OOI) that are occluded by occluding objects in property measurements.

The objects of interest (OOI) can function as the basis for a set of property attributes, be segmented out and used to mask other objects, and/or be otherwise used. The OOIs can be exterior property components, interior property components, and/or be any other suitable property component. The OOIs can be: built structures (e.g., primary structures, secondary structures, buildings, sheds, pools, decks, courts, garages, gazebos, etc.), paved surfaces (e.g., roads, parking lots, driveways, alleyways, sidewalks, etc.), vegetation (e.g., trees, lawns, forests, gardens, etc.), water features (e.g., pool, hot tub, pond, etc.), additions (e.g., trampolines, solar panels, fences, etc.), and/or any other suitable property feature or property component. Additionally or alternatively, the OOI can be a subcomponent of the property component, such as a roof, wall, cabinet, window, siding, diving board, and/or any other suitable subcomponent.

Each OOI can be associated with a property of interest or be unassociated with any properties. A property can be or include: a parcel (e.g., land), a property component or set or segment thereof, and/or otherwise defined. For example, the property can include both the underlying land and improvements (e.g., built structures, fixtures, etc.) affixed to the land, only include the underlying land, or only include a subset of the improvements (e.g., only the primary building). The property can be identified by one or more property identifiers. A property identifier (property ID) can include: geographic coordinates, an address, a parcel identifier, a block/lot identifier, a planning application identifier, a municipal identifier (e.g., determined based on the ZIP, ZIP+4, city, state, etc.), and/or any other identifier. The property identifier can be used to retrieve property data, such as parcel information (e.g., parcel boundary, parcel location, parcel area, etc.), property measurements, and/or other data. The property identifier can additionally or alternatively be used to identify a property component, such as a primary building or secondary building, and/or otherwise used.

The occluding objects can occlude all or a portion of the OOI depicted in the measurement. The occluding objects can be: vegetation (e.g., tree, plant, etc.), shadows, clouds, man-made objects and/or installations (e.g., trampolines, lamp posts, debris, solar panels, other structures, etc.), temporary obstructions (e.g., planes, hot air balloons, hang gliders, birds, drones, etc.), and/or any other suitable object. The occluding objects can be identified by a dedicated object detector specific to the occluding object, by a generic occlusion detector (e.g., trained to detect any occlusion), and/or otherwise identified. However, the occluding objects can be not identified. The occluding objects can be associated with: a number of occluding objects within a measurement, a percentage of a measurement that is occluded, a percentage of an OOI that is occluded, and/or any other suitable metric. Each OOI can be occluded by one or more occluding objects.

The measurements can function as the basis for attribute extraction, OOI infilling, occlusion detection, and/or otherwise used. A measurement preferably depicts a property (e.g., the property of interest), but can additionally or alternatively depict the surrounding geographic region, adjacent properties, and/or other features. The measurement can be: 2D, 3D or geometric, and/or have any other set of dimensions. Examples of measurements can include: images (e.g., 2D images, 3D images, etc.), surface models (e.g., digital surface models (DSM), digital elevation models (DEM), digital terrain models (DTM), etc.), point clouds (e.g., generated from LIDAR, RADAR, stereoscopic imagery, etc.), depth maps, depth images, virtual models (e.g., geometric models, mesh models), audio, video, and/or any other suitable measurement. Examples of images that can be used include: an image captured in RGB, hyperspectral, multispectral, black and white, grayscale, IR, NIR, UV, thermal, synthetic aperture radar (SAR), LiDAR, RADAR, and/or captured using any other suitable wavelength; images including or generated from multiple measurement modalities (e.g., using multi-sensor fusion); images with depth values associated with one or more pixels (e.g., DSM, DEM, etc.); and/or other images.

The measurements can include: remote measurements (e.g., satellite imagery; aerial imagery, such as balloon imagery, drone imagery, airplane imagery; etc.), local or on-site measurements (e.g., sampled by a user, streetside measurements, etc.), and/or sampled at any other proximity to the property. The measurements can be exterior measurements, interior measurements, and/or any other measurement. The remote measurements can be measurements sampled more than a threshold distance away from the property, such as more than 100 ft, 500 ft, 1,000 ft, any range therein, and/or sampled any other distance away from the property. Measurements can be: aerial imagery (e.g., captured from an aircraft, such as a plane, helicopter, balloon, kite, etc.), satellite imagery (e.g., captured from a satellite), drone imagery (e.g., captured from a drone), on-site imagery (e.g., street view image, aerial image captured within a predetermined distance to an OOI, such as using a drone, etc.), interior imagery, exterior imagery, and/or any other suitable measurement.

The measurements can include: top-down measurements (e.g., nadir measurements, panoptic measurements, etc.), side measurements (e.g., elevation views, street measurements, etc.), angled/oblique measurements (e.g., at an angle to vertical, orthographic measurements, isometric views, etc.), and/or sampled from any other pose or angle relative to the property.

The measurements can be a full-frame measurement, a segment of the measurement (e.g., the segment depicting the property, such as that depicting the parcel and/or only the parcel; the segment depicting a geographic region a predetermined distance away from the property; etc.), a merged measurement (e.g., a mosaic of multiple measurements), orthorectified, and/or otherwise processed.

The modules of the system function to process the measurements (e.g., crop measurements, segment measurements, infill measurements, etc.), extract property attributes, and/or perform other functionalities. The system can include one or more models of the same or different type. The models can be or include: a neural network (e.g., CNN, DNN, etc.), a diffusion model, a VAE, a VQ-VAE, a GAN, a polyhedral model, a template matching model, a model for defining shapes of 3D or 2D objects, an equation (e.g., weighted equations), leverage regression, classification, rules, heuristics, instance-based methods (e.g., nearest neighbor), regularization methods (e.g., ridge regression), decision trees, Bayesian methods (e.g., Naïve Bayes, Markov, etc.), kernel methods, probability, deterministics, support vectors, and/or any other suitable model or methodology. The classifiers (e.g., classification models) can include machine learning models, sets of rules, heuristics, and/or any other suitable classification model. The classification models can be neural networks (e.g., DNN, CNN, RNN, etc.), decision trees, SVMs, and/or any other suitable machine learning model. The models can be semantic segmentation models, instance-based segmentation models, and/or any other segmentation model. The models can be trained on: synthetic data, manually-labelled data, insurance claims data, real estate data (e.g., sales data), and/or any other suitable ground truth training data set. The models can be trained using supervised learning, unsupervised learning, single-shot learning, zero-shot learning, and/or any other suitable learning technique.

The modules of the system can include one or more: infilling modules, attribute modules, occlusion modules, object modules, and/or any other module.

The infilling module can be configured to infill one or more regions within a measurement. The infilled regions can be: portions of the OOI that are occluded (e.g., by an occluding object), portions of other objects at least partially depicted or occluded in the measurement, and/or any other suitable region. The measurement region can be one or more: sets of pixels or voxels, groups or clusters of pixels or voxels, measurement segments, and/or measurement regions. In a first variant, the infilled region can be pixels and/or voxels that were removed and/or masked out (e.g., regions that are missing measurement values). In a second variant, the infilled region can already have values within the measurement (e.g., not be masked out), and be regions that the infilling module has identified as being an occlusion (e.g., classified as an occlusion). However, the region being infilled can be otherwise defined.

Figure 11:
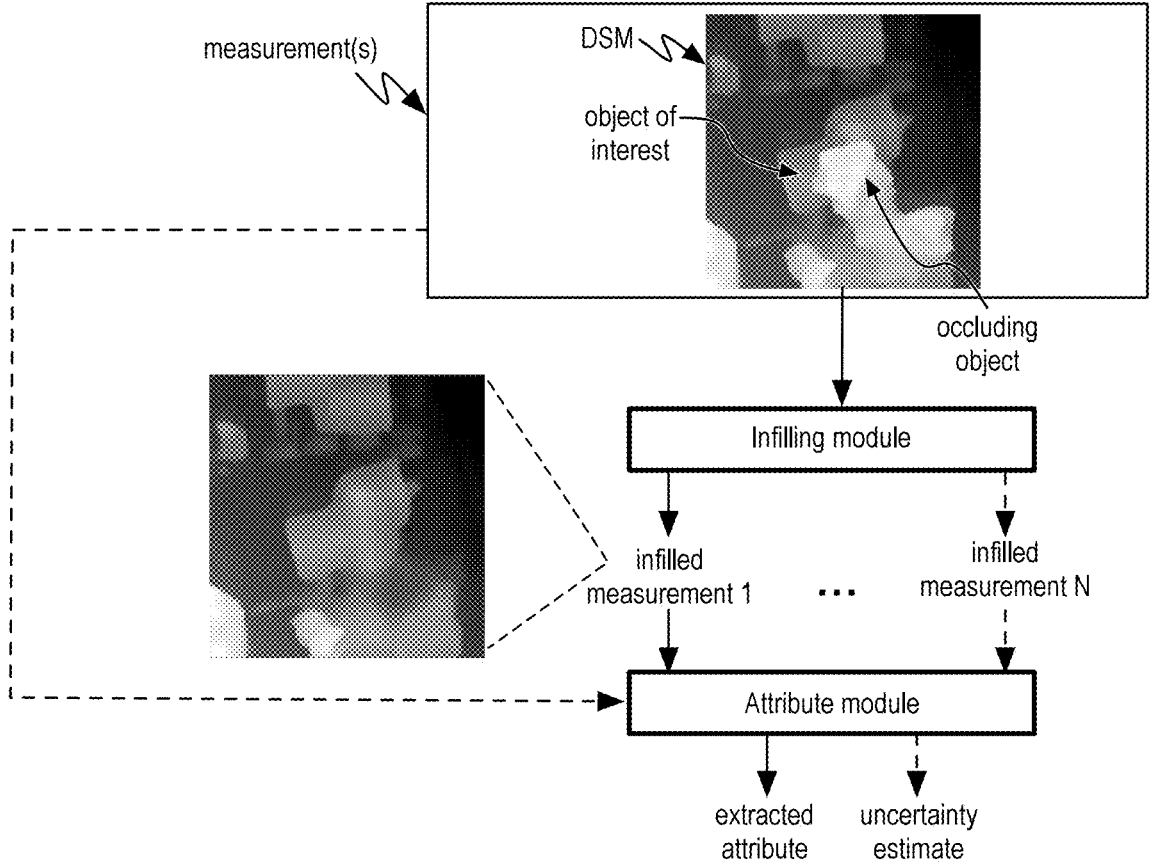
FIG. 11 is an illustrative example of a variant of the method.

The infilling module can infill: a masked-out measurement, an unmasked measurement (e.g., model trained to infill regions of the measurement that are non-OOI; example shown in FIG. 11; etc.), a measurement limited to OOI segments, and/or any other suitable measurement. The OOI boundaries in the measurement can be unoccluded, at least partially occluded, and/or otherwise occluded. The measurement can depict at least a threshold proportion of the OOI to be infilled, and/or not depict the OOI at all (e.g., wherein the OOI is infilled based on OOI information not depicted in the measurement, such as text descriptions).

The infilling module can infill the measurement based on: the measurement, an unprocessed measurement, the depicted OOI segment (e.g., extracted from the uncorrected measurement), parcel data for the property (e.g., parcel boundary), additional OOI information (e.g., roof pitch, other property attribute and/or component values, data from a third-party, etc.), text descriptions of the property (e.g., real estate descriptions, inspection reports, etc.), neighboring property data (e.g., OOI segments from neighboring properties, neighboring property parcel information, etc.), comparable property data (e.g., OOI segments from comparable properties, comparable property parcel information, etc.), and/or any other suitable auxiliary data and/or information. In a first example, the infilling module infills the measurement based on only the measurement (e.g., based on the masked or unmasked measurement). In a second example, the infilling module infills the measurement based on the measurement and auxiliary data (e.g., parcel data, text descriptions, etc.). In a third example, the infilling module infills the measurement based on the measurement and a secondary measurement (e.g., from another domain or modality); example shown in FIG. 5. In an illustrative example, the infilling module can infill a geometric measurement (e.g., a DSM) using both the geometric measurement and an appearance-based measurement (e.g., an RGB image). However, the infilling module can use or exclude any other set of inputs.

The infilling module can generate: a filled-in measurement (e.g., occluded areas are filled in with pixel and/or voxel values), a shape estimate (e.g., boundary estimate), a heatmap, a mask, and/or any other suitable information.

The infilling module can be specific to: an OOI class (e.g., roof, building, pool, etc.), an occluding object class, a measurement type (e.g., 2D measurement, 3D measurement, interior measurement, exterior measurement, etc.), a neighborhood, a geographic region (e.g., a continent, a country, a state, a county, a city, a zip code, a street, a school district, etc.), a property class (e.g., single-family home, multi-family home, a house, an apartment, a condominium, etc.), a timeframe (e.g., a season, a week of the year, a month, a specific set of dates, etc.), and/or be otherwise specific. Additionally and/or alternatively, the infilling module can be generic among: an occluding object class, an OOI class, a measurement type (e.g., 2D measurement, 3D measurement, interior measurement, exterior measurement, etc.), a neighborhood, a geographic region (e.g., a continent, a country, a state, a county, a city, a zip code, a street, a school district, etc.), a property class (e.g., single-family home, multi-family home, a house, an apartment, a condominium, etc.) and/or be otherwise generic.

Figure 12:
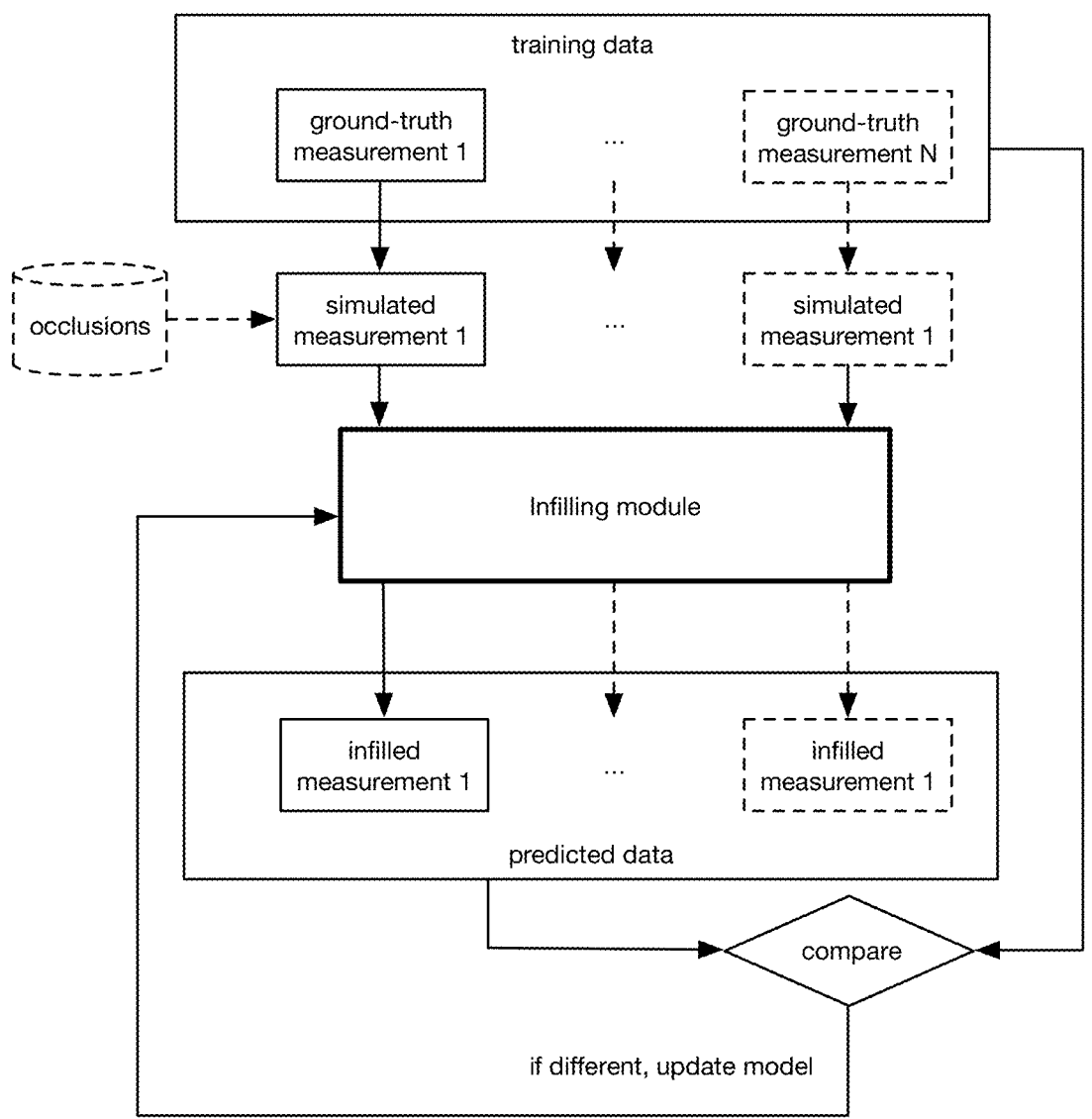
FIG. 12 is an illustrative example of training a generative model.

In a first variant, the infilling module can include one or more generative models. The generative model is preferably a generative adversarial network and/or a diffusion model, but can additionally or alternatively be a variational autoencoder, a conditional variational autoencoder, a normalizing flow model, and/or any other suitable generative model. In an example, the generative model ingests a 3D measurement with an occlusion masked out (e.g., using an occluding object segment that is extracted from a 2D measurement and aligned with the 3D measurement) and generates an infilled 3D measurement. In another example, the generative model ingests a 2D measurement or a 3D measurement with an occlusion and infills the occluded portion of the OOI in the 2D measurement or 3D measurement. However, the generative model can be otherwise configured. The generative model can be trained on measurements (e.g., RGB images, DSMs, DEMs, etc.) depicting: occluded OOIs with unoccluded training targets, synthetic data (e.g., unoccluded training targets with masked-out or occluded OOI regions, etc.), and/or any other suitable training data. The training measurements can be: retrieved from a database, accessed using an API from a third-party, simulated, and/or otherwise determined by the system. In an illustrative example, the generative model can be trained by: obtaining ground-truth measurements depicting unoccluded OOIs, simulating training measurements by occluding or masking out portions of the OOIs within the ground-truth measurements, and training the generative model to predict ground-truth measurements from respective training measurements by infilling the occluded portions of the OOIs; example shown in FIG. 12. In variants, the generative model can be trained using a discriminative model (e.g., classifier as described above) that is trained to classify the pixels of an output prediction from the generative model as real or fake. The predictions of the discriminative model can be used in the objective function of the generative model for training the generative model. However, the generative model can be otherwise trained.

In a second variant, the infilling module can include a shape fitting model (e.g., template matching model, template fitting model, etc.). In this variant, the infilling module can predict the unoccluded OOI shape (e.g., boundaries, geometry, etc.) based on the unoccluded OOI portions that are visible in the measurement. In this variant, the infilling module can be trained to predict (e.g., fit) known OOI shapes based on: occluded OOI segments, measurements depicting occluded OOIs, and/or any other information. In an embodiment of this variant, the infilling module can include template fitting (e.g., fitting a set of canonical building atlases to roof boundaries directly or indirectly and finding the maximum likelihood building atlas match). In this variant, the occluded OOI region can be recovered by fitting a template on the visible OOI segment and infilling the occluded OOI region based on the portion of the template that intersects the occluded OOI region. The template is preferably determined based on template matching (e.g., fitting a set of canonical building atlases to roof boundaries directly or indirectly, and finding the maximum likelihood building atlas match), but can additionally and/or alternatively be determined by a user, and/or otherwise determined.

In a third variant, the infilling module can include structural or geometric inpainting. For example, the occluded OOI region can be recovered by adaptively propagating local 3D surface smoothness (e.g., limited to the visible OOI segment depicted in the measurement) from around the boundary of the occlusion into the occlusion (e.g., using geometric cues from the remainder of the measurement).

In a fourth variant, the infilling module can include textural inpainting. For example, the occluded OOI region can be recovered by adaptively propagating local appearance and/or textures (e.g., limited to the visible OOI segment depicted in the measurement) from around the boundary of the occlusion into the occlusion (e.g., using appearance cues from the remainder of the measurement).

In a fifth variant, the infilling module can include a combination of the above variants.

However, the infilling module can include a polyhedral model, a model for defining shapes of 3D or 2D objects, and/or any other suitable model.

However, the infilling module can be otherwise configured.

The attribute module can be configured to determine one or more property attributes based on one or more property measurements. The attribute model preferably outputs values for property attributes and/or components, but can additionally or alternatively output feature segments, uncertainty values, and/or any other suitable information.

Attributes can be property components, features (e.g., feature vector, mesh, mask, point cloud, pixels, voxels, any other parameter extracted from a measurement), any parameter associated with a property component, and/or higher-level summary data extracted from property components and/or features. Attributes associated with a property component can include: location (e.g., centroid location), boundary, distance (e.g., to another property component, to a geographic landmark, to wildland, setback distance, etc.), material, type, presence, count, density, geometry parameters (e.g., footprint and/or area, area ratios and/or percentages, complexity, number of facets and/or other elements, slope, height, etc.), condition (e.g., a condition rating), hazard context, geographic context, vegetation context (e.g., based on an area larger than the property), weather context, terrain context, historical construction information, ratios or comparisons therebetween, and/or any other parameter associated with one or more property components.

Property attributes can include: structural attributes (e.g., for a primary structure, accessory structure, neighboring structure, etc.), location (e.g., parcel centroid, structure centroid, roof centroid, etc.), property type (e.g., single family, lease, vacant land, multifamily, duplex, etc.), pool and/or pool component parameters (e.g., area, enclosure, presence, pool structure type, count, etc.), deck material, car coverage (e.g., garage presence), solar panel information, HVAC parameters (count, footprint, etc.), porch/patio/deck parameters (e.g., construction type, area, condition, material, etc.), fence parameters (e.g., spacing between fences), trampoline parameters (e.g., presence), pavement parameters (e.g., paved area, percent illuminated, etc.), foundation elevation, terrain parameters (e.g., parcel slope, surrounding terrain information, etc.), and/or any other attribute that remains substantially static after built structure construction.

Structural attributes can include: the structure footprint, structure density, count, structure class/type, proximity information and/or setback distance (e.g., relative to a primary structure, relative to another property component, etc.), building height, parcel area, number of bedrooms, number of bathrooms, number of stories, roof parameters (e.g., area, area relative to structure area, geometry/shape, slope, complexity, number of facets, height, material, roof extension, solar panel presence, solar panel area, etc.), framing parameters (e.g., material), flooring (e.g., floor type), historical construction information (e.g., year built, year updated/improved/expanded, etc.), area of living space, ratios or comparisons therebetween, and/or other attribute descriptive of the physical property construction.

Condition-related attributes can include: roof condition (e.g., tarp presence, material degradation, rust, missing or peeling material, sealing, natural and/or unnatural discoloration, defects, loose organic matter, ponding, patching, streaking, etc.), exterior condition, accessory structure condition, yard debris and/or lot debris (e.g., presence, coverage, ratio of coverage, etc.), lawn condition, pool condition, driveway condition, tree parameters (e.g., overhang information, height, etc.), vegetation parameters (e.g., coverage, density, setback, location within one or more zones relative to the property), presence of vent coverings (e.g., ember-proof vent coverings), structure condition, occlusion (e.g., pool occlusion, roof occlusion, etc.), pavement condition (e.g., percent of paved area that is deteriorated), resource usage (e.g., energy usage, gas usage, etc.), and/or other parameters that are variable and/or controllable by a resident. Condition-related attributes can be a rating for a single structure, a minimum rating across multiple structures, a weighted rating across multiple structures, and/or any other individual or aggregate value.

Other examples of property attributes can include attributes as disclosed in U.S. application Ser. No. 17/529,836 filed on 18 Nov. 2021, U.S. application Ser. No. 17/475,523 filed on 15 Sep. 2021, or U.S. application Ser. No. 17/749,385 filed on 20 May 2022, each of which is incorporated herein in its entirety by this reference.

Attribute values can be discrete, continuous, binary, multiclass, and/or otherwise structured. The attribute values can be associated with time data (e.g., from the underlying measurement timestamp, value determination timestamp, etc.), a hazard event, a mitigation event (e.g., a real mitigation event, a hypothetical mitigation event, etc.), an uncertainty parameter, and/or any other suitable metadata.

Attribute values can optionally be associated with an uncertainty parameter. Uncertainty parameters can include variance values, a confidence score, and/or any other uncertainty metric. In a first illustrative example, the attribute value model classifies the roof material for a structure as: shingle with 90% confidence, tile with 7% confidence, metal with 2% confidence, and other with 1% confidence. In a second illustrative example, 10% of the roof is obscured (e.g., by a tree), which can result in a 90% confidence interval for the roof geometry attribute value. In a third illustrative example, the vegetation coverage attribute value is 70%±10%.

The system can include one or more attribute modules. In a first variant, the system includes a different attribute module for each attribute of interest. In a second variant, the system includes a single attribute module (e.g., a multiclass classifier) that determines (e.g., predicts) values for each of a set of attributes. However, any other number of attribute modules, configured in any manner, can be used.

The attribute modules preferably determine the attribute values based on a property measurement, but can additionally or alternatively determine the attribute values based on an OOI segment, additional OOI information (e.g., other property attribute and/or component values, data from a third-party, etc.), auxiliary data (e.g., parcel data, text descriptions, etc.), and/or any other information. The property measurement is preferably an infilled measurement (e.g., infilled DSM, infilled RGB image, etc.), but can additionally or alternatively be an original or uncorrected measurement (e.g., original DSM, original RGB image, etc.), and/or any other suitable measurement.

The attribute modules can be or include: a neural network (e.g., CNN, DNN, etc.), an equation (e.g., weighted equations), leverage regression, classification, rules, heuristics, instance-based methods (e.g., nearest neighbor), regularization methods (e.g., ridge regression), decision trees, Bayesian methods (e.g., Naïve Bayes, Markov, etc.), kernel methods, probability, deterministics, support vectors, heuristics (e.g., inferring the number of stories of a property based on the height of a property), classification models (e.g., binary classifiers, multiclass classifiers, semantic segmentation models, instance-based segmentation models, etc.), regression models, object detectors, any computer vision and/or machine learning method, and/or any other suitable model or methodology. Different attribute modules can use the same or different methods.

Figure 3:
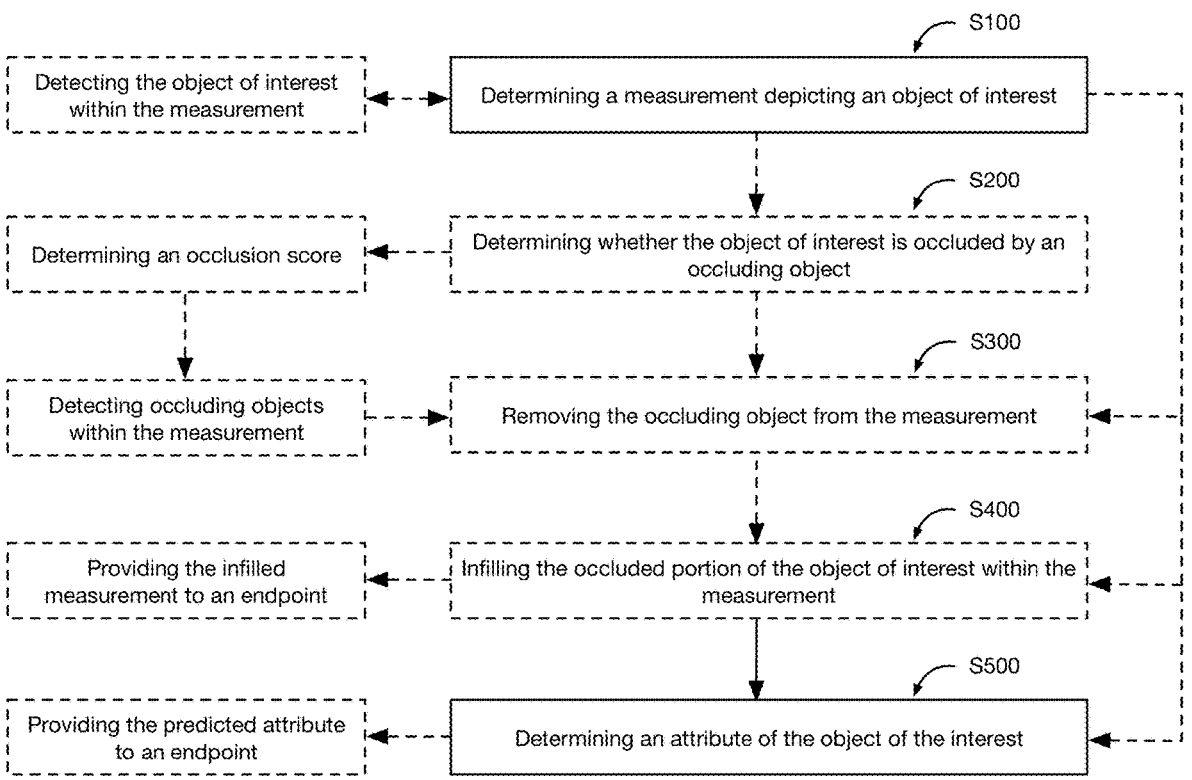
FIG. 3 is an illustrative example of a variant of the method.

The attribute values can be determined by: extracting features from property measurements and determining the attribute values based on the extracted feature values, extracting attribute values directly from property measurements, retrieving values from a database or a third party source (e.g., third-party database, MLS database, city permitting database, historical weather and/or hazard database, tax assessor database, etc.), using a predetermined value (e.g., assuming a given mitigation action has been performed as described in S380), calculating a value (e.g., from an extracted value and a scaling factor, etc.), and/or otherwise determined; an example is shown in FIG. 3. The attribute values can be: based on a single property, based on a larger geographic context (e.g., based on a region larger than the property parcel size), and/or otherwise determined.

However, the attribute module can be otherwise configured.

The object module can be configured to detect different objects in a measurement (e.g., detect the presence or absence of an object; determine a bounding box around the measurement; etc.), extract an object segment from a measurement (e.g., determine the pixels corresponding to the object), but can alternatively be configured to perform any other suitable functionality. The system can include one or more object modules (e.g., object detectors). An object module can be specific to a single object class (e.g., an OOI class, an occluding object class, etc.), a location context (e.g., geographic region, municipality, zoning, developed environment class, average distance between buildings, etc.), a measurement type, a property class, and/or otherwise specific or generic. Alternatively, the classification model can be generic among object classes, measurement types, geographic regions, property classes, and/or be otherwise generic. The object can be: an OOI, an occluding object, a property component, and/or any other suitable feature depicted in the measurement.

The object module can be applied to an uncorrected measurement, a corrected measurement, and/or any other measurement. The object modules preferably ingest RGB images and/or DSMs, but can additionally and/or alternatively ingest point clouds, meshes, parcel data, other 2D measurements, other 3D measurements, and/or any other suitable measurements (e.g., 2D measurements, 3D measurements, etc.) and/or information.

The object module can include one or more classification models, geometric models (e.g., constructive solids geometry), and/or any other suitable models. The classification models can be configured to determine occluding object classes, occluding object scores, occluding object masks, property component measurements, and/or any other suitable information. The classification models preferably output one or more representations, but can additionally or alternatively output one or more classes (e.g., for the measurement, for a pixel of the measurement, etc.), one or more scores or values, and/or any other suitable information. The representation is preferably a mask, but can additionally or alternatively be a heatmap, a label, a bounding box, boundaries, one or more segments associated with a region image, a score or value, a binary classification, and/or any other information. The classification models can be binary classifiers (e.g., roof vs background, ground vs. non-ground, shadow vs. non-shadow, vegetation vs. non-vegetation, etc.), a multi-class classifier (e.g., multiple labels such as roof, ground, vegetation, shadow, etc.), and/or any other suitable classifier. The classification models can be supervised (e.g., trained using training data), unsupervised, semi-supervised, and/or any otherwise trained or not trained. The training targets can be manually determined, synthetically determined, and/or otherwise generated. However, the classification models can be otherwise configured.

The object module can optionally include a segmentation module; alternatively, the segmentation module can be separate from the object module. The segmentation module is preferably configured to determine segmentation masks for the occluding object, the OOI, and/or any other suitable object in the image. The segmentation module preferably includes multiple segmentation models, each trained to determine segmentation masks for different occluding object classes (e.g., for different types of occluding objects, such as a tree segmentation model, a plane segmentation model, etc.) and for different OOI classes (e.g., for different types of OOIs, such as a primary structure segmentation model, a lawn segmentation model, etc.). Additionally or alternatively, the segmentation model can include a single segmentation model for all object classes (e.g., for both occluding objects and OOIs), two separate segmentation models, such as for OOIs and occluding objects, and/or any other suitable number of segmentation models.

The segmentation models preferably ingest DSMs, but can additionally or alternatively ingest RGB images, grayscale images, point clouds, or any other suitable measurement.

The segmentation model is preferably a semantic segmentation model, such as a neural network, and can be trained based on training data (e.g., measurements and labelled occlusion masks). Additionally or alternatively, the segmentation model is an instance-based segmentation model, a classifier, and/or any other segmentation model. The neural network can be a CNN, a feed forward network, a transformer network, and/or any other suitable network. The neural network can have a U-net architecture (e.g., with an encoder and decoder), a ResNet architecture, and/or any other suitable architecture. The segmentation model can be a binary classifier (e.g., property component vs background), a multi-class classifier (e.g., different types of structures vs background), an object detector, and/or any other suitable classifier, but can additionally or alternatively leverage classical segmentation methods (e.g., gray level segmentation, conditional random fields, etc.) and/or other methods. During inference, the method can: use the same trained segmentation model in all contexts, selectively use the trained segmentation model based on a location context (e.g., developed environment class, such as urban, rural, etc.; location information, such as street, neighborhood, etc.; zoning; etc.), and/or otherwise use the trained segmentation model.

However, the segmentation module can be otherwise configured.

However, the object module can be otherwise configured.

The occlusion module is preferably configured to determine whether an OOI is occluded by an occluding object and optionally determine an occlusion score, but can additionally or alternatively be configured to determine whether a measurement includes any other objects that are occluded, a type of occluding object, an occluding object score, and/or any other suitable information. The occlusion module can use or include an object module described above, rule, heuristics, and/or any other suitable technique for determining whether the OOI is occluded.

In a first variant, the occlusion module can use the object module to determine whether the occluding object segment overlaps with and/or is adjacent to the OOI segment. If the occluding object segment overlaps with and/or is adjacent to the OOI segment, the OOI is determined to be occluded. Alternatively, if the occluding object segment does not overlap with the OOI segment, the OOI is determined to not be occluded.

In a second variant, the occlusion module can determine whether the visible OOI segment (e.g., depicted in the measurement) is a complete OOI segment, and treat an incomplete OOI segment as occluded. In embodiments, the occlusion module can include an object module configured to detect the OOI segment, and shape analysis module configured to determine whether the detected OOI segment is complete. The shape analysis module can include a set of heuristics, a shape fitting module (e.g., attempt to fit the OOI segment to a set of known complete OOI shapes), and/or any other module. For example, the OOI can be considered complete the OOI boundary is smooth, whether the OOI boundary has only right angles, In a second variant, the occlusion module can include one or more occlusion score models. The occlusion score model can ingest a 2D measurement (e.g., an RGB image), a 3D measurement (e.g., a DSM), an OOI identifier, an OOI segment, an OOI boundary, parcel data, and/or any other suitable information. The occlusion score model preferably outputs an occlusion score representing an area of occlusion for an OOI, but can additionally and/or alternatively output the ingested measurement, the OOI identifier, and/or any other suitable information. Based on whether the occlusion score satisfies a threshold, the occlusion module can determine whether the OOI is determined to be occluded. The occlusion score model can be specific to an OOI class, an occluding object class, a measurement type, a geographic region, a property class, and/or be otherwise specified. Alternatively, the occlusion score model can be generic among OOI classes, occluding object classes, measurement types, geographic regions, property classes, and/or be otherwise generic. The occlusion score model can be: a neural network (e.g., CNN, DNN, etc.), an equation (e.g., weighted equations), leverage regression, classification, rules, heuristics, instance-based methods (e.g., nearest neighbor), regularization methods (e.g., ridge regression), decision trees, Bayesian methods (e.g., Naïve Bayes, Markov, etc.), kernel methods, probability, deterministics, support vectors, and/or any other suitable model or methodology.

However, the occlusion module can be otherwise configured.

However, the system can include any other set of modules.

The system can additionally or alternatively include a computing system (e.g., processing system, platform, etc.), a set of databases, a set of interfaces, and/or any other suitable components.

The computing system can include a remote computing system (e.g., one or more servers, one or more platforms, etc.), a user device (e.g., smartphone, laptop, desktop, tablet, etc.), and/or other computing system. The computing system can function to execute all or portions of the method, and/or perform any other suitable functionality.

The computing system can be used with a user interface (e.g., mobile application, web application, desktop application, API, database, etc.) or not be used with a user interface. The user interface can be used to: receive property identifiers, present attribute and/or property analysis results, and/or otherwise used. In examples, the computing system can include: a remote computing system and a user device that interfaces with the remote computing system via an API, a remote computing system that interfaces with a third-party via an API, and/or otherwise be used with a user interface.

The computing system can optionally include one or more third-party interfaces (e.g., APIs, etc.), which function to interface with third party systems (e.g., databases) to retrieve information, receive requests, and/or otherwise interact with third party systems.

The databases can function to store the measurements, OOI masks, occluding object masks, parcel data (e.g., parcel masks), and/or any other information. The database can be queried to retrieve the measurements, OOI masks, occluding object masks, parcel masks, and/or any other suitable information used to perform the method. The query can include geographic coordinates, an address, and/or any other property identifier (e.g., used to identify a parcel and/or group of parcels).

However, the system can include any other suitable components.

5. Method

The method for occlusion correction can include: determining a measurement depicting an object of interest (OOI) S100, optionally determining whether the object of interest is occluded by an occluding object S200, optionally removing the occluding object from the measurement S300, optionally infilling the occluded portion of the object of interest within the measurement S400, and determining an attribute of the object of interest S500. However, the method can include any other set of processes.

All of (or a portion thereof) the method can be performed by the system disclosed above, or by any other suitable system. The method can be performed in response to a receiving a request (e.g., for an OOI, for a measurement, for a property, etc.), periodically (e.g., for a measurement, for an OOI, for a property, etc.), in response to receiving an updated measurement for an OOI or property, randomly, and/or performed at any other suitable time.

The method can be performed for: a single property, multiple properties, and/or any other suitable number of properties. The method can be performed for one or more properties: concurrently, serially, upon request, and/or at any other time. In a first example, the method can be performed for a property responsive to receipt of a request (e.g., property analysis request). In a second example, the method can be performed for multiple properties as a batch. However, the method can be performed in any other order for any suitable set of properties.

5.1. Determining a Measurement Depicting an Object of Interest S100.

Determining a measurement depicting an object of interest S100 functions to provide a measurement for occlusion removal (e.g., removing occluding objects that overlay the OOI in the measurement). S100 is preferably performed before S200, but can additionally and/or alternatively be performed concurrently with S200, after S200, and/or any other suitable time. S100 can be performed: responsive to receipt of a request (e.g., for analysis of a property of interest), responsive to notification that the measurement is available, and/or at any other time. The measurement can be: received as part of a request (e.g., API request), retrieved from a database (e.g., local database, third-party database, etc.), received from a third-party (e.g., image provider), determined based on a property identifier (e.g., geographic descriptor, address, geocoordinates, parcel identifier, municipal identifier), and/or otherwise determined. In a first example, the measurement can be received as part of the request. The request can be an API request and/or any other suitable request.

Figure 6:
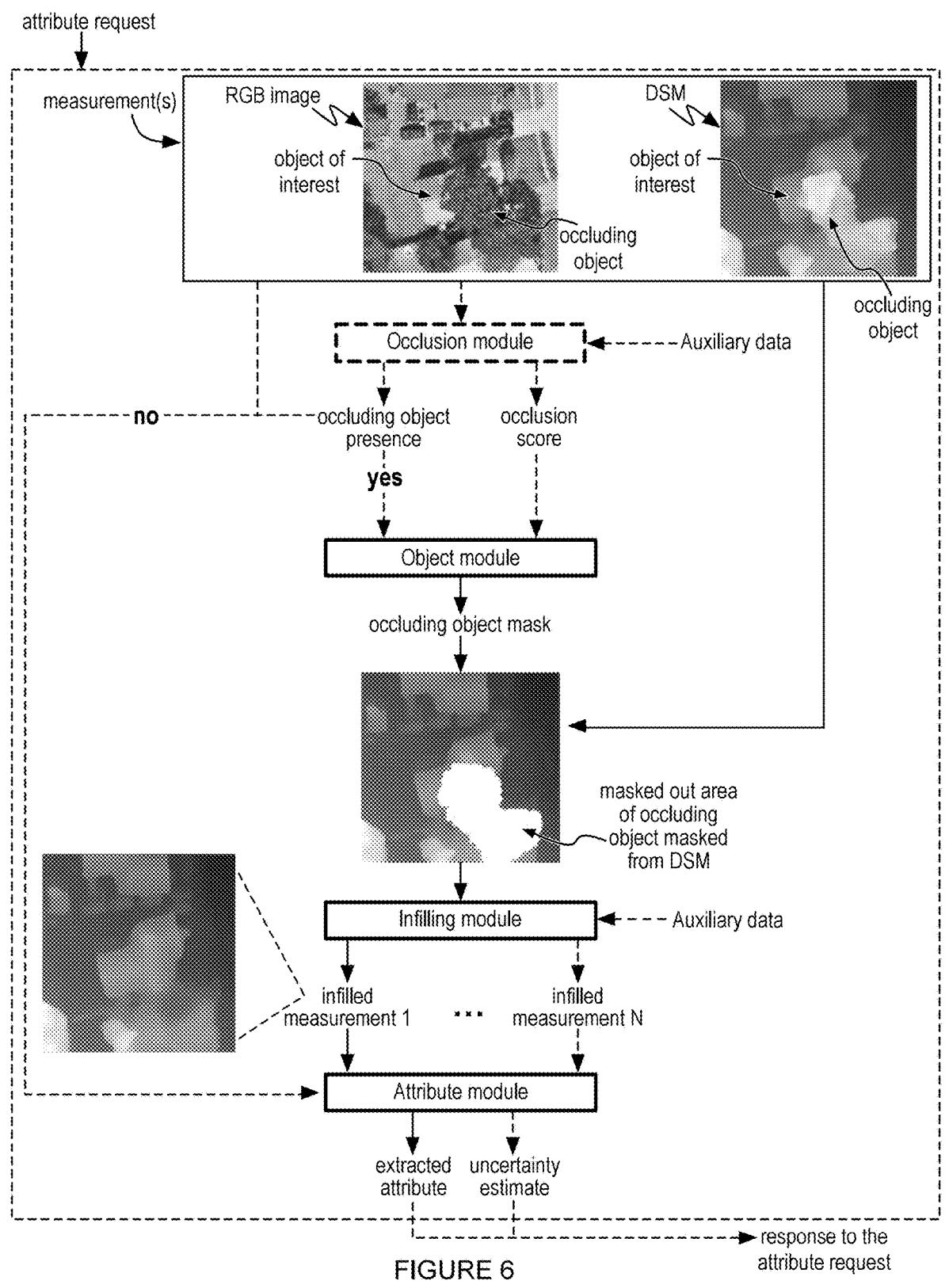
FIG. 6 is an illustrative example of a variant of the method.

The measurement can be: one measurement, multiple measurements, and/or any other suitable number of measurements of the same or different type (e.g., domain or modality). The measurement can be a 2D measurement, 3D measurement, appearance-based measurement (e.g., RGB measurement), geometric measurement (e.g., DSM, DEM, etc.), and/or any other type of measurement. The measurement is preferably a measurement as described above, but can additionally and/or alternatively be any other suitable measurement. The measurement is preferably associated with a property of interest, but can additionally and/or alternatively be associated with multiple properties, any/or any other suitable property. An example of a measurement is depicted in FIG. 6, wherein the OOI is occluded by a tree.

In a first variant, S100 can include determining a wide-scale measurement that includes multiple properties.

In a second variant, S100 can include determining a measurement that is limited to the property of interest (e.g., segmented using parcel data associated with the property of interest).

In a third variant, S100 can include determining a measurement that includes the segment depicting the property of interest and its surrounding region (e.g., predetermined distance from the property of interest).

However, the measurement depicting an OOI is otherwise determined.

S100 can optionally include detecting the OOI within the measurement; example shown in FIG. 3. The detected OOI segment can be used as the input to the infilling model, used to determine whether the OOI is occluded, and/or otherwise used. The OOI can be detected within: all measurements, some measurements, and/or any other suitable number of measurements. In a first example, the OOI is detected only within an RGB image. In a second example, the OOI is detected only within a DSM. In a third example, the OOI is detected in both an RGB image and DSM.

In a first variant, detecting the OOI within the measurement can include determining an OOI mask. The OOI mask can be: predetermined for the measurement and retrieved from a database; predetermined for a location (e.g., address, parcel identifier, etc.) and the OOI mask and the measurement can be retrieved from a database using the location; determined using a classifier (e.g., object module configured to detect the OOI), wherein the classifier can ingest the measurement and output the OOI mask; and/or otherwise determined.

In a second variant, detecting the OOI within the measurement can include determining a measurement segment depicting the OOI (e.g., using the object module). The measurement segment depicting the OOI (e.g., chip, such as a square, rectangle, or other polygon around the OOI) can depict all, most, or a subset of the OOI, and can optionally depict an ambient environment surrounding all or a portion of the OOI (e.g., context).

In a third variant, detecting the OOI within the measurement can include determining an OOI bounding box using an OOI detector.

However, the OOI within the measurement can be otherwise detected.

5.2. Determining Whether the Object of Interest is Occluded by an Occluding Object S200.

Determining whether the object of interest is occluded by an occluding object S200 functions to determine whether the OOI in the measurement needs to be infilled. In a first example, an OOI (e.g., roof) can be deemed occluded when it is partially covered by vegetation (e.g., tree), debris, or solar panels, or other occlusion. In a second example, an OOI (e.g., roof) can be deemed occluded when it is partially in the umbra of another structure, clouds, object, vegetation, and/or other physical occlusion. In a third example, an OOI (e.g., roof) can be deemed occluded when it is partially covered by a tree, but deemed unoccluded when it is covered by only solar panels. In another example, an OOI can be deemed occluded when less than a threshold proportion of the OOI is visible (e.g., less than 90%, 80%, 70%, 60%, 50%, 40%, 30%, 20%, 10%, etc.), less than a threshold OOI area is visible, when the occluding object occupies more than a threshold proportion of a dimension of the OOI (e.g., extends along more than 1% of the OOI side), and/or when any other condition is met. However, the OOI can be classified as occluded or unoccluded under any other set of conditions.

S200 can be performed: after S100, before S300, after occluding objects are detected, before the OOI is detected, after the OOI is detected, independent of OOI detection, not performed, and/or performed at any other suitable time. In variants, when there is no presence of occluding objects, the measurement can be used directly for attribute determination in S500. When there is presence of occluding objects and/or the OOI is classified as occluded, the measurement can be corrected for occlusion in S300-S400. Alternatively, the method can skip S200 (e.g., wherein the OOI and/or measurement is always attempted to be infilled), and/or otherwise use S200. S200 is preferably performed using the occlusion module, but can additionally and/or alternatively be performed by any other suitable module.

In a first variant, S200 can include using one or more classifiers of the occlusion module to determine the presence of occlusions (e.g., OOI occluded by an occluding object) in the measurement. Additionally or alternatively, the occlusion module can classify the OOI segment and/or the measurement as occluded or unoccluded.

In a second variant, S200 can include using heuristics to determine whether the OOI is occluded. In a first example, if the OOI is detected and includes a boundary (e.g., closed loop of straight edges), the OOI is determined to be not occluded. In a second example, if the OOI has holes and is expected to not have holes, the OOI is determined to be occluded. In a third example, if the OOI segment has a non-linear boundary, the OOI is determined to be occluded. In a fourth example, if the occluding object segment is within a predetermined distance of the OOI segment, the OOI is determined to be occluded. However, heuristics can be otherwise used.

In a third variant, S200 can include obtaining a measurement that is pre-associated with a label indicating occluding object presence in the measurement.

However, whether the OOI is occluded by an occluding object can be otherwise determined.

S200 can optionally include determining an occlusion score (e.g., amount of occlusion). The occlusion score is preferably determined when occlusion presence is detected (e.g., in the measurement; within a predetermined distance of the OOI; etc.), but can additionally and/or alternatively be determined at any other suitable time. The occlusion score can represent an area of the OOI that is covered (e.g., hidden) by an occluding object; the model's confidence that the OOI is occluded; and/or be representative of any other metric. The occlusion score can be: numerical and/or categorical, Boolean and/or non-Boolean, normalized and/or non-normalized, a percentage (e.g., of an OOI depicted in the measurement, of the measurement, etc.), a measure (e.g., total square area of occluding object overlapping with the OOI), a label, and/or any other suitable score. When the occlusion score is below a threshold, the measurement can be used directly for attribute determination in S500, and/or when the occlusion score is above a threshold, the measurement can be corrected for occlusion in S300-S400.

In a first variant, determining an occlusion score can include using a classifier trained on labeled images that include occluding OOIs and a labelled occlusion score.

In a second variant, determining an occlusion score can include using one or more heuristics. The heuristics can be based on OOI boundaries (e.g., straight lines for structures indicate no occlusion, non-straight lines indicate occlusion, etc.), time of year, and/or any other suitable heuristic.

In a third variant, determining an occlusion score can include using the object module to determine an occlusion representation (e.g., mask or boundaries for occluding objects); and comparing the OOI representation and the occlusion representation to determine the occlusion score (e.g., calculating the intersection-over-union (IOU) of the two representations, and/or any other area of overlap measure).

In a fourth variant, determining an occlusion score can include using an occlusion score model from the occlusion module that ingests the measurement and outputs an occlusion score.

However, the occlusion score can be otherwise determined.

S200 can optionally include detecting occluding objects within the measurement. Occluding objects within the measurement can be detected to determine a measurement segment depicting the occluding objects, to be used for a basis for infilling in S400, and/or otherwise used. The occluding objects can be detected within: all measurements, some measurements, the measurements used to determine whether the OOI is occluded, a different measurement from that used to determine whether the OOI is occluded (e.g., wherein the second measurement is of a different modality, wherein the cues from the different modality can aid in more accurate occluding object detection, etc.), the same or different measurement as that being corrected in S400, and/or any other suitable number of measurements. In a first example, the occluding objects (e.g., trees, vegetation, etc.) are detected only within an appearance-based measurement (e.g., RGB image). In a second example, the occluding objects are detected only within a geometric measurement (e.g., DSM). In a third example, the occluding objects are detected within all measurements being used.

Detecting the occluding objects (and/or any objects) within the measurement can include: detecting the presence of the object within the measurement, detecting the extent of the object within the measurement (e.g., the measurement units depicting the object), the position of the object (e.g., within the measurement; the global position; etc.), and/or determining any other suitable set of object parameters.

In a first variant, detecting occluding objects within the measurement can include determining an occluding object mask. The occluding object mask can be: predetermined for the measurement and retrieved from a database; determined using a classifier, wherein the classifier can ingest the measurement and output the occluding object mask; determined using an OOI mask, wherein all pixels and/or voxels not part of the OOI masked are determined to be part of the occluding object mask; and/or otherwise determined. In an illustrative example, when the OOI is a roof and the occluding object is a tree, this can include detecting a vegetation mask or a tree mask in a color image (e.g., RGB image), which can optionally be used to mask out the corresponding voxels in a geometric measurement (e.g., the corresponding pixels in a DSM) in S300.

In a second variant, detecting the occluding object within the measurement can include determining an occluding object bounding box using the occluding object detector.

However, the occluding objects within the measurement can be otherwise detected.

5.3. Removing the Occluding Object from the Measurement S300.

Removing the occluding object from the measurement S300 functions to reset and/or mask values of the measurement associated with the area of the occluding object (e.g., the area where the occluding object overlaps the OOI, the total area of the occluding object, etc.). S300 can be performed after S100 (e.g., performed regardless of occluding object detection from S200, all measurements with or without occlusions can be processed, etc.), after S200 (e.g., after the presence of the occluding object is detected or when no occluding object is detected, after the OOI is classified as occluded, etc.), before S500, not performed, and/or any other suitable time. S300 can include removing one or more occluding objects (e.g., one or more occluding object instances, one or more occluding object types, etc.).

S300 is preferably performed using an occluding object mask, but can additionally and/or alternatively be performed using a different mask, and/or otherwise performed. The occluding object mask is preferably a binary mask, but can additionally or alternatively be a boundary of the occluding object, a heatmap, and/or any other suitable representation of the occluding object. The occluding object mask is preferably determined using an object module configured to detect the occluding object, but can additionally and/or alternatively be performed using the occlusion module, and/or any other suitable module. The object module can be a generic object module (e.g., trained to segment multiple classes of objects), be an object-specific object module (e.g., trained to segment trees, pools, roofs, etc.), and/or otherwise configured. The occluding object mask is preferably determined from a geometric measurement (e.g., DSM, a point cloud, etc.), but can additionally or alternatively be determined from an appearance-based measurement (e.g., RGB image, a grayscale image, etc.), and/or any other suitable measurement. The occluding object mask can be determined from the same and/or different measurement type as that being masked. The occluding object mask can be determined from the same and/or different measurement instance as that being masked. For example, a vegetation mask from a measurement sampled in a first timeframe (e.g., season) is used to mask a measurement sampled in second timeframe (e.g., season). In another example, a mask determined from an image can be used to mask a geometric measurement.

S300 can optionally be performed using parcel data (e.g., parcel boundary, geofence, etc.) for the property associated with the occluding object. In a first example, only occluding objects limited to regions within a parcel boundary are removed from the measurement. In a second example, occluding object removal does not extend beyond the parcel boundaries of the property associated with the occluding object and/or does not extend into the parcel boundaries of neighboring properties. However, parcel data can be otherwise used.

One or more instances of the occluding object can be from the measurement. In a first variation, all instances of the occluding object(s) can be removed from the measurement. In a second variation, only the instances of the occluding object(s) that are occluding the OOI are removed (e.g., wherein said instances can be identified based on heuristics, rules, proximity to the OOI segment, and/or otherwise identified). However, any other set of occluding object instances can be removed from the measurements.

S300 can result in a masked area, wherein the values (e.g., for pixels, voxels, etc.) of the masked area can be re-defined to a generic value (e.g., 0, no information, negative infinity, infinity, etc.). S300 can be performed by combining the occluding object mask with the measurement, by identifying the pixels appearing in both the object mask and the measurement, and/or otherwise performed. The object mask can be combined with the measurement using multiplication, subtraction, addition, exponentiation, division, and/or any other suitable technique.

In a first variant, the occluding object can be masked from a 3D measurement (e.g., DSM). In a first example, the occluding object mask is determined from an RGB image, and a DSM that is pixel-aligned with the RGB image is masked with the occluding object mask (e.g., to exclude the occluding object data). In an illustrative example, a vegetation mask is determined from an RGB image to mask out non-roof pixels from the DSM. In a second example, the occluding object mask is determined from the same 3D measurement (e.g., DSM).

In a second variant, the occluding object can be masked from a 2D measurement (e.g., RGB image). In a first example, the occluding object is detected within an RGB image and removed. In a second example, the occluding object mask is determined from a DSM, and an RGB image that is pixel-aligned with the DSM is masked with the occluding object mask However, the occluding object from the measurement can be otherwise removed.

5.4. Infilling the Occluded Portion of the Object of Interest within the Measurement S400.

Infilling the occluded portion of the object of interest within the measurement S400 functions to estimate values for an area in the measurement that was previously occluded by the occluding object. In variants, this can function to generate an updated (e.g., infilled) measurement depicting an unoccluded version of the OOI. S400 can optionally include infilling other, non-OOI regions of the measurement (e.g., masked-out measurement regions, regions without values, etc.). S400 is preferably performed after S300 (e.g., after masking the occluding object from the measurement), but can additionally and/or alternatively be performed without S300 (e.g., without the removing the occluding object from the measurement), after S100, after S200, without S200, before S500, and/or any other suitable time. S400 is preferably performed by the infilling module, but can additionally or alternatively be performed by any other suitable module. The infilling module is preferably specific to an OOI type, but can alternatively be generic among OOI types. In examples, a roof infilling model is trained to infill roofs, a pool infilling model is trained to infill pools, and a deck infilling model is trained to infill decks. In another example, a single infilling model is trained to infill roofs, pools, and decks. The infilling module can determine one or more infilled measurements (e.g., infilled 2D measurement, infilled 3D measurement, infill masked measurement, unmasked measurement, etc.), property attribute and/or component values, and/or any other suitable information.

S400 is preferably performed using a property measurement, but can alternatively be performed using multiple property measurements, and/or any other information. In a first variant, the property measurement is the measurement from S300, with the occluding object removed. In a second variant, the measurement is from S100 or S200, and can include the occluding object. The measurement is preferably a geometric measurement (e.g., a DSM, a DEM, a point cloud, a mesh, etc.), but can additionally or alternatively be an appearance-based measurement (e.g., an RGB image) and/or any other measurement. The measurement can be the full-frame measurement, a cropped measurement (e.g., cropped to the property parcel boundary, cropped within a predetermined distance of the property boundary, etc.), an OOI segment (e.g., including only measurement regions depicting the OOI), and/or be any other measurement. Cues from the measurement (e.g., the regions depicting the OOI, the regions depicting non-OOI features, etc.) can be used to infill the occluded portions of the OOI; alternatively, the OOI can be otherwise infilled.

S400 can additionally or alternatively be performed using auxiliary data. For example, this data can be passed as an input or in a side channel to the infilling module, used to disambiguate or select an infilled measurement candidate that is output by the infilling module, and/or otherwise used. Examples of auxiliary data that can be used include: parcel data, property attribute or component data (e.g., values), property descriptions, and/or any other suitable data.

S400 can be performed using parcel data (e.g., parcel boundary, geofence, etc.) for the property associated with the OOI. In a first example, infilling is only limited to regions within a parcel boundary of the property associated with the OOI. In a second example, infilling the OOI does not extend beyond the parcel boundaries of the property associated with the OOI and/or does not extend into the parcel boundaries of neighboring properties. However, parcel data can be otherwise used.

S400 can be performed using property attribute and/or component data. The property attributes and/or component data can be extracted from the measurement being infilled or from another measurement (e.g., of the same property, of a similar property, etc.). For example, the roof pitch of visible roof regions can be used to estimate the occluded extent of the roof. In another example, the shadow cast by the building and the estimated angle of the sun at the measurement timestamp can be used to reinforce or select an infilled candidate (e.g., wherein the selected infilled candidate is estimated to generate a similar shadow). However, the property attribute data can be otherwise used.

S400 can be performed using descriptions of the property. The descriptions can be from permit data, real estate listing data, inspection data, insurance data, and/or any other information. In a first example, a building footprint, roof surface area, or living area can be extracted from the property description, which can be used to limit roof infilling (e.g., the infilled roof corresponds to an estimated footprint or living area substantially similar to the extracted building footprint or living area) and/or otherwise provide information about the roof extent. In a second example, a flat green feature that is partially visible in the measurement can be classified as a pool (e.g., as the OOI in S100) and infilled using the pool infilling module when the description specifies that a pool exists on the property, but be classified and infilled as a lawn when the description does not specify that a pool exists on the property. In a third example, sentiment and/or keywords can be extracted from the descriptions and fed as features into the infilling module. However, the descriptions can be otherwise used.

However, any other set of information can be used in any other manner to infill the measurement.

In a first variant, S400 can include using an infilling module (e.g., infilling model) trained to infill a measurement. In a first example, the infilling model generates an infilled 3D measurement based only on the masked 3D measurement. In a second example, the infilling model generates an infilled 3D measurement based on both the masked 3D measurement (e.g., DSM) and the 2D measurement (e.g., RGB image, with or without the occluding object masked out, etc.), and/or can optionally output an infilled 2D measurement (e.g., infilled RGB image) based on only the 2D measurement or a combination of the 2D and 3D measurement (e.g., leveraging both appearance and geometric cues). In a third example, the infilling model generates the infilled 3D measurement (e.g., infilled DSM) based on the masked 3D measurement (e.g., DSM) and an OOI boundary (e.g., retrieved from a third-party database, such as city records). In a fourth example, the infilling model generates an infilled 3D measurement (e.g., infilled DSM) based on the original 3D measurement, optionally based on an occluding object mask (e.g., generated from a 2D measurement, such as an image) and/or OOI mask (e.g., generated from the 2D measurement), and optionally based on auxiliary data. In a fifth example, the infilling model generates an infilled 2D measurement and/or 3D measurement based only on the 2D measurement (e.g., RGB image, with or without the occluding object masked out, etc.).

In a second variant, S400 can include determining shape candidates on neighboring properties (e.g., determined within a predetermined radius), fitting the shape candidates to the OOI, selecting the shape candidate with the best-fit to the OOI (e.g., determined by using a similarity score), and determining the infilled measurement based on the selected shape candidate. The shape candidate can be one of a set of predetermined templates (e.g., roof templates, pool templates, etc.), shapes determined based on neighboring properties (e.g., determined within a predetermined radius), and/or any other suitable set of shapes.

In a third variant, S400 can include using a shape estimator based on visible OOI boundaries, and determining the infilled measurement based on the shape estimator.

However, the occluded portion of the OOI within the measurement can be otherwise infilled.

However, the infilled measurement can be otherwise provided.

The method can optionally include providing the infilled measurement to an endpoint through an interface. The endpoint can be: an endpoint on a network, a customer endpoint, a user endpoint, an AVM system, a real estate listing service, an insurance system, a property attribute and/or component extraction system, a 3D model building system, and/or any other suitable endpoint. The interface can be: a mobile application, a web application, a desktop application, an API, a database, and/or any other suitable interface executing on a user device, a gateway, and/or any other suitable computing system.

5.5. Determining an Attribute of the Object of Interest S500.

Determining an attribute of the object of interest S500 functions to determine a property attribute and/or component of the OOI from the measurement. S500 is preferably determined after S400, but can additionally and/or alternatively be performed after S100, after S200, during S500 (e.g., wherein the infilling module can also extract attribute values), and/or any other suitable time. The measurement is preferably an infilled measurement (e.g., infilled DSM, infilled RGB image, etc.) and/or an infilled OOI segment (e.g., 2D segment, 3D segment, etc.), but can additionally or alternatively be an original measurement (e.g., original DSM, original RGB image, etc.), a 2D measurement (e.g., RGM image), a 3D measurement (e.g., DSM), and/or any other suitable measurement.

Figure 7:
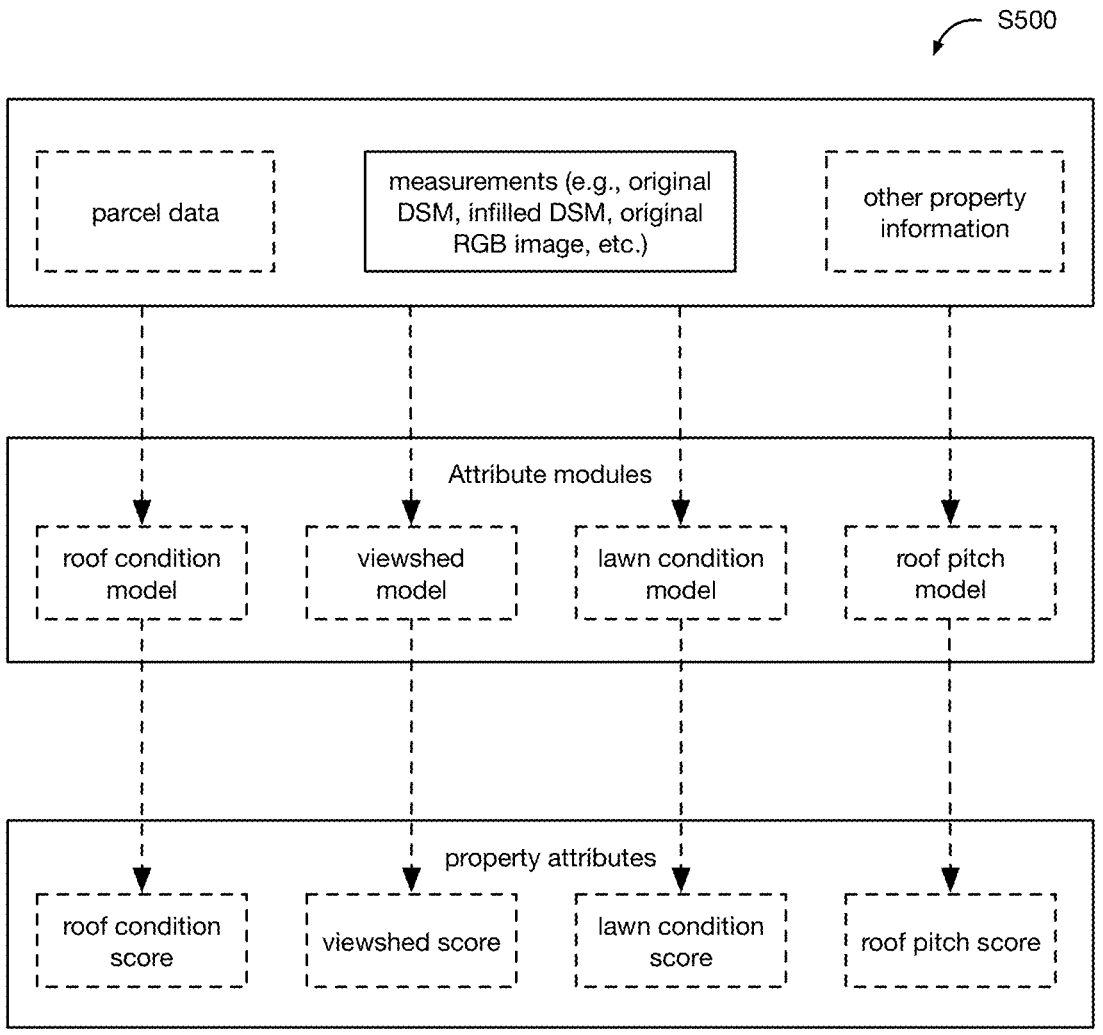
FIG. 7 is an illustrative example of determining an attribute.

S500 is preferably determined using an attribute module (example shown in FIG. 7), but can additionally and/or alternatively be retrieved from a database, retrieved from a third-party (e.g., real estate listing service, tax assessor, permits, etc.), determined using a different module, and/or otherwise determined.

In a first variant, S500 can include determining one or more attribute module and inputting the measurement (e.g., infilled measurement) into the attribute module, wherein the attribute module outputs values for one or more property attributes and/or components. In an example, when multiple measurements are determined in S400, the property attributes and/or components can be determined from each measurement and an uncertainty estimate can be calculated using the determined property attributes and/or components. Alternatively, an uncertainty estimate can be determined for each value extracted from each measurement. Alternatively, a single attribute value can be determined from multiple measurements (e.g., infilled or not infilled).

In a second variant, S500 can include determining a property attribute based on a property component extracted from the measurement. The property component is prefer-ably the OOI, but can additionally and/or alternatively be another object within the measurement. The property com-ponent can be extracted using a component detector and/or object detector trained to detect the property component. In a first example, determining a property attribute based on an extracted property component includes calculating an area of a component segment. In a second example, determining a property attribute based on an extracted property compo-nent includes counting a number of facets in a component segment. In a third example, determining a property attribute based on an extracted property component includes deter-mining a distance between a component segment and another component segment.

In a first embodiment, determining a property attribute based on an extracted property component includes deter-mining the roof surface area. In a first example, determining the roof surface area includes measuring the length and width of each plane of the roof, multiplying the length and width of each plane, and adding the results of the multipli-cation to calculate the roof surface area. Additionally or alternatively, when the roof includes non-rectangular poly-gon facets, the roof surface area can be calculated using Gauss's area calculation and/or any other suitable technique. In a second example, determining the roof surface area can include using a method such as that discussed in U.S. application Ser. No. 17/475,523 filed on 15 Sep. 2021, which is incorporated herein in its entirety by this reference.

In a second embodiment, determining a property attribute based on an extracted property component includes deter-mining the pitch of a property feature, such as a roof (e.g., ratio of roof rise over run). The pitch can be: a dominant pitch, a pitch per property feature facet (e.g., roof facet), a pitch substantially similar to (e.g., equal to) a standard pitch, and/or any other suitable pitch metric. The pitch be deter-mined from the pitches of a set of measurement units (e.g., voxels, pixels, mesh cells or triangles, etc.) associated with the property feature segment (e.g., from the distribution of pitches, from a statistical measure of the pitches, etc.), from the geometry of each property feature facet (e.g., using the pose of a plane fitted to the mesh cells of a roof facet), and/or otherwise determined. The occluding object mask can be used to remove the pixels and/or associated pitch values that are associated with the occluding objects, and/or otherwise used.

Figure 8:
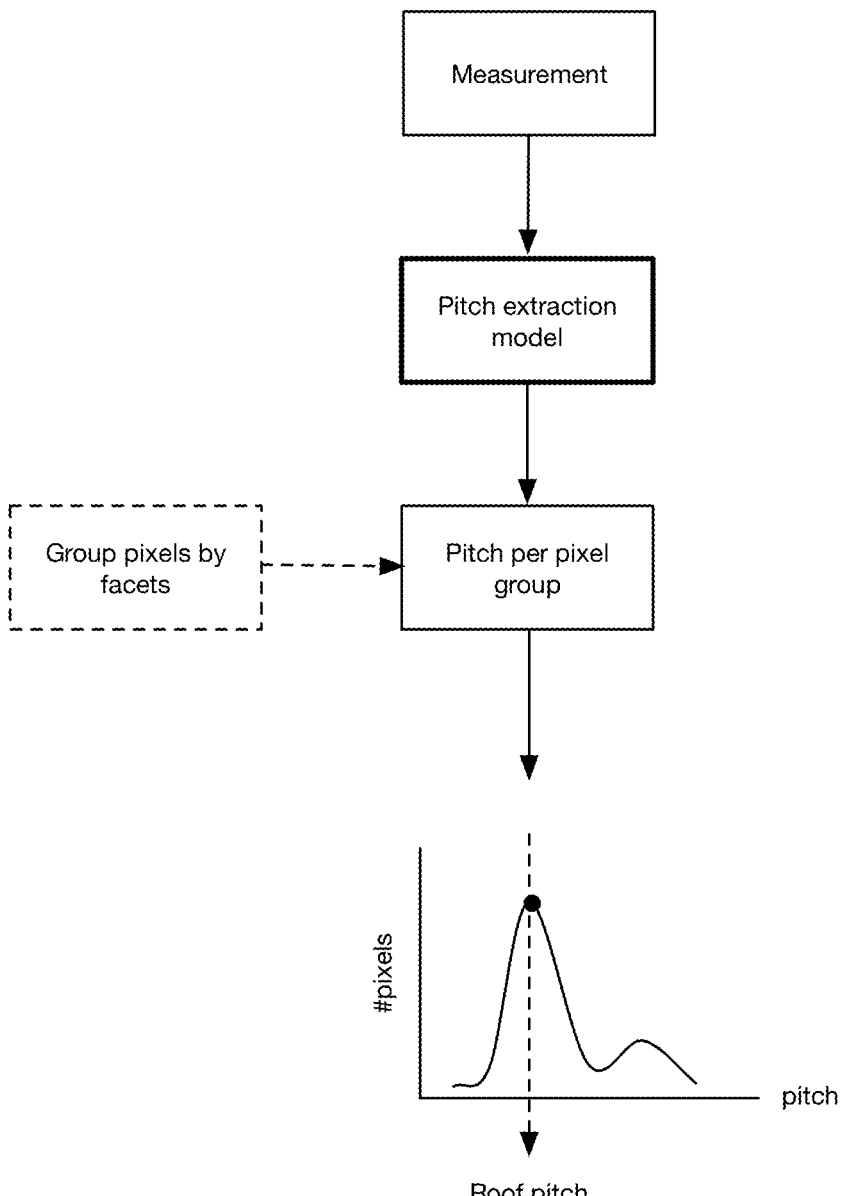
FIG. 8 is a schematic representation of a specific example of determining a roof pitch.
Figure 9:
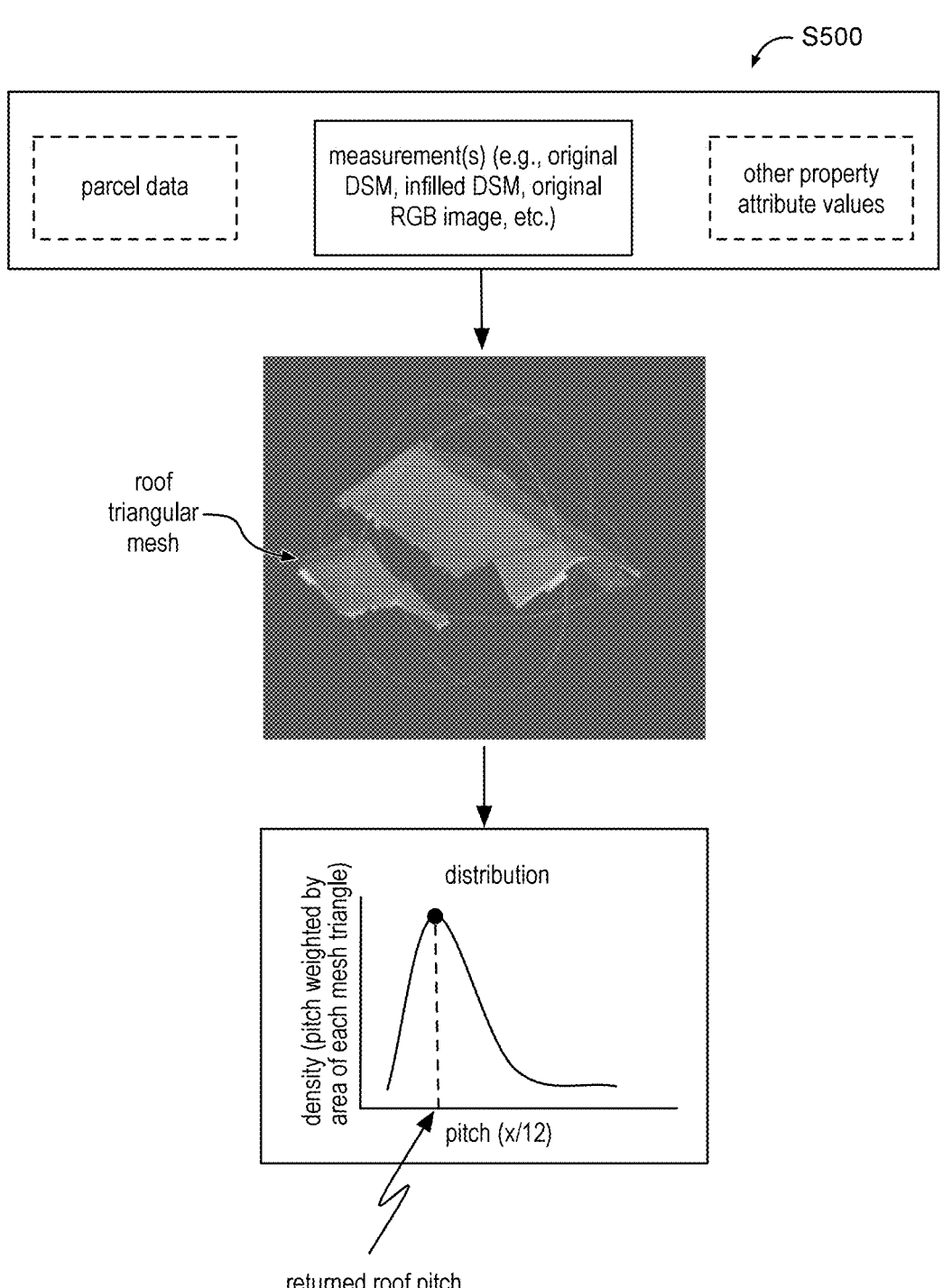
FIG. 9 is an illustrative example of determining a roof pitch.

In a first example, determining roof pitch can include determining a distribution of roof pitch (e.g., pitch distribu-tion across the mesh cells, per pixel group, per voxel group, etc.) extracted from a measurement (e.g., DSM, RGB image, etc.) and/or other information (e.g., parcel data), and return-ing the pitch values associated with the distribution's peaks, average, mode, median, and/or any other suitable statistical measure; example shown in FIG. 8. For example, the roof pitches for each measurement unit of the property compo-nent can be aggregated into a histogram with roof pitch on the x-axis and density on the y-axis; and the peak(s) within the histogram (e.g., area/percentage of roof) can be treated as the roof pitch; example shown in FIG. 9. The roof pitch can optionally be determined based on roof segment size, roof segment arrangement, and/or any other suitable roof parameter (e.g., roof segment parameter). In examples, this can account for small roof segments that would otherwise have been ignored or clustered with other segments. The roof pitch per measurement unit (e.g., pixel, voxel, etc.) can be determined: from the measurement itself (e.g., wherein the measurement includes the slope or pitch value); from the voxel's normal vector (e.g., relative to gravity or another reference axis); using a vision-based model; and/or other-wise determined.

In a second example, determining roof pitch can include determining the pitch per measurement unit (e.g., the mesh cells, per pixel group, per voxel group, etc.) extracted from a measurement (e.g., DSM, RGB image, etc.) and/or other information (e.g., parcel data); and returning the roof pitches that satisfy a set of conditions. The set of conditions can include: more than a threshold number or proportion of measurement units having the pitch; the pitch being close to (e.g., equal to, within a threshold distance of, closest to) an industry standard pitch; and/or any other suitable set of conditions.

In a third example, determining roof pitch can include extracting a roof segment from a measurement (e.g., DSM, RGB image, etc.) and/or other information (e.g., parcel data); determining roof facets from the extracted roof seg-ment; and using the pose of a plane fitted to the roof facets to determine a roof pitch.

However, the roof pitch can be otherwise determined.

In a third embodiment, determining a property attribute based on an extracted property component includes deter-mining roof geometry such as roof shape (e.g., flat, mono-pitched, pent, multi-pitched, circular, hyperbolic, hip, cross-hip, gable, Dutch gable, gambral, mansard, butterfly, skillion/lean-to, salt-box, etc.), location of roof geometry, and/or proportion of roof geometry belonging to a standard roof shape. For example, determining roof shape can include extracting a roof segment from a measurement (e.g., DSM, RGB image, etc.) and/or other information (e.g., parcel data), and fitting a polygon and/or shape to the roof segment, wherein properties in the same neighborhood are associated with a set of predetermined roof shapes.

In a fourth embodiment, determining a property attribute based on an extracted property component includes deter-mining the roof footprint (e.g., boundaries of a roof) using one or more of the classifiers of the attribute module that ingests the measurement and outputs the roof footprint. Alternatively, the roof footprint can be determined from the OOI mask (e.g., extracted from the original or infilled measurement).

In a fifth embodiment, determining a property attribute based on an extracted property component includes deter-mining roof complexity (e.g., the number of, and/or arrange-ment of, facets that make up the roof, roof topology, etc). The roof complexity can be identified using one or more of the classifiers of the attribute module that ingests the mea-surement and outputs the number of facets and/or the identified facets (e.g., mask, boundary, etc.).

In a sixth embodiment, determining a property attribute based on an extracted property component includes deter-mining structure height using one or more of the classifiers of the attribute module that ingests the measurement (e.g., DSM) and outputs the structure height. For example, deter-mining structure height can include determining a DSM (e.g., infilled DSM, original DSM, etc.); optionally isolating to pixels within the OOI segment using a model and/or measurement; and determining the heights of each pixel using a classifier, wherein the classifier outputs the tallest height (or set of heights) as the structure height.

In a seventh embodiment, determining a property attribute based on an extracted property component includes determining heating living spaces. Determining heating living spaces includes determining a volume of the structure from the roof footprint and the roof height at each point (e.g., determined from the infilled OOI segment).

In an eighth embodiment, determining a property attribute based on an extracted property component includes determining the paved surface geometry (e.g., boundary) using one or more classifiers of the attribute module that ingests the measurement and outputs the paved surface geometry as a mask and/or any other suitable representation.

However, the attribute of the OOI can be otherwise determined.

S500 can optionally include providing the predicted attribute and/or component value to an endpoint through an interface. The endpoint can be: an endpoint on a network, a customer endpoint, a user endpoint, an AVM system, a real estate listing service, an insurance system, a property attribute and/or component extraction system, a 3D model building system, and/or any other suitable endpoint. The interface can be: a mobile application, a web application, a desktop application, an API, a database, and/or any other suitable interface executing on a user device, a gateway, and/or any other suitable computing system.

However, the predicted attribute and/or component value can be otherwise provided.

The method can optionally include determining a property analysis based on the property attributes (example shown in FIG. 4). Examples of property analyses include: the attribute values, real estate valuations (e.g., estimated based on one or more attribute values), timeseries analyses (e.g., property change over time, property change detection, etc.), insurance estimates, whether inspectors should be deployed, overall condition estimates, and/or any other suitable property analysis. The same property attribute value can be used for one or more property analyses. The property analyses can be performed by analysis models (e.g., automated valuation models, etc.), be manually performed, and/or be otherwise performed.

For example, all or portions of the systems and/or methods described above can be used for automated property valuation, for insurance purposes, and/or otherwise used. For example, any of the outputs discussed above (e.g., for the property) can be provided to an automated valuation model (AVM), which can predict a property value based on one or more of the attribute values (e.g., component values) generated by the one or more models discussed above and/or attribute value-associated information. The property attributes and/or component values can be used to determine: automated valuation model error, automated valuation model accuracy, automated property valuation or price, and/or any other suitable value. The AVM can be: retrieved from a database, determined dynamically, and/or otherwise determined.

The method can optionally include determining interpretability of one or more of the modules discussed above (e.g., the infilling model, the object model, etc.), wherein the identified attributes (and/or values thereof) can be provided to a user, used to identify errors in the data, used to identify ways of improving the modules, and/or otherwise used. For example, interpretability methods can be used to explain why the infilling module predicted the extent, geometries, and/or appearance of the infilled portion of the measurement. Interpretability methods can include: local interpretable model-agnostic explanations (LIME), Shapley Additive explanations (SHAP), Ancors, DeepLift, Layer-Wise Relevance Propagation, contrastive explanations method (CEM), counterfactual explanation, Protodash, Permutation importance (PIMP), L2X, partial dependence plots (PDPs), individual conditional expectation (ICE) plots, accumulated local effect (ALE) plots, Local Interpretable Visual Explanations (LIVE), breakDown, ProfWeight, Supersparse Linear Integer Models (SLIM), generalized additive models with pairwise interactions (GA2Ms), Boolean Rule Column Generation, Generalized Linear Rule Models, Teaching Explanations for Decisions (TED), and/or any other suitable method and/or approach.

All or a portion of the models discussed above can be debiased (e.g., to protect disadvantaged demographic segments against social bias, to ensure fair allocation of resources, etc.), such as by adjusting the training data, adjusting the model itself, adjusting the training methods, and/or otherwise debiased. Methods used to debias the training data and/or model can include: disparate impact testing, data pre-processing techniques (e.g., suppression, massaging the dataset, apply different weights to instances of the dataset), adversarial debiasing, Reject Option based Classification (ROC), Discrimination-Aware Ensemble (DAE), temporal modelling, continuous measurement, converging to an optimal fair allocation, feedback loops, strategic manipulation, regulating conditional probability distribution of disadvantaged sensitive attribute values, decreasing the probability of the favored sensitive attribute values, training a different model for every sensitive attribute value, and/or any other suitable method and/or approach.

6. Illustrative Examples

In a first example, the method can include: retrieving the property parcel for a property (e.g., a single property, for each of a set of properties, etc.), determining a measurement segment associated with (e.g., encompassing or encompassed by) the parcel, and performing the rest of the method (e.g., S200-S500; S400-S500; S500 only; etc.) using the measurement segment.

In a second example, the method can include: retrieving property parcel data for a property, identifying the segment of the infilled measurement associated with (e.g., encompassing or encompassed by) the parcel data, and determining property attributes and/or components associated with (e.g., based on or extracted from) the infilled measurement segment.

In a third example, the method can include: detecting all OOIs associated with one or more properties within a measurement, optionally removing and/or masking out all occlusions within the measurement, and infilling all OOIs within the measurement.

In a first illustrative example, the method can include: obtaining a 2D image (e.g., RGB image) and/or a corresponding 3D image (e.g., DSM) depicting an OOI (e.g., primary building; largest property component segment on a parcel, such as a primary residence or primary office building; etc.); optionally determining whether the OOI is occluded by an occluding object (e.g., a tree) by feeding the 2D image into the occlusion module; optionally calculating an occluding object mask by feeding the 2D image into an object module and using the occluding object mask to mask out the occluding object from the 3D image; optionally infilling the masked area of the 3D image using an infilling module (e.g., a generative model); optionally masking the infilled 3D image with a OOI mask (e.g., determined from the 2D image) to isolate depth information for the OOI; and using the infilled 3D image to determine a property attribute and/or component of the OOI, such as a roof surface area; example shown in FIG. 6. The method can optionally include determining an OOI segment from the 2D image using an object module (e.g., the same or different from the occluding object module), and optionally determining a segment of the 2D image and 3D image encompassing the OOI segment, wherein the 2D and 3D image segments are used for masking, infilling, and analysis.

In a second illustrative example, the method can include: obtaining an RGB image and corresponding DSM depicting an OOI (e.g., primary building); optionally determining whether the OOI is occluded by an occluding object by feeding the RGB image into the occlusion module; optionally infilling the area occluded by the occluding object of the DSM using a generative model; optionally masking the infilled DSM with a OOI mask (e.g., determined from the RGB image) to isolate depth information for the OOI; and using the infilled DSM to determine a property attribute and/or component of the OOI.

In a third illustrative example, the method can include: obtaining one or more images (e.g., RGB image, DSM, etc.) depicting a predetermined built structure class; optionally determining parcel data; optionally segmenting the one or more images based on the parcel data; infilling an area occluded by an occluding object (e.g., within an original image, within a segmented image, etc.) using a generative model (e.g., wherein the generative model is trained to infill the built structure class); using the infilled image to determine a property attribute and/or component of the OOI; and optionally using the parcel data to determine which property identifier (e.g., address) is associated with the property attribute and/or component.

Figure 10:
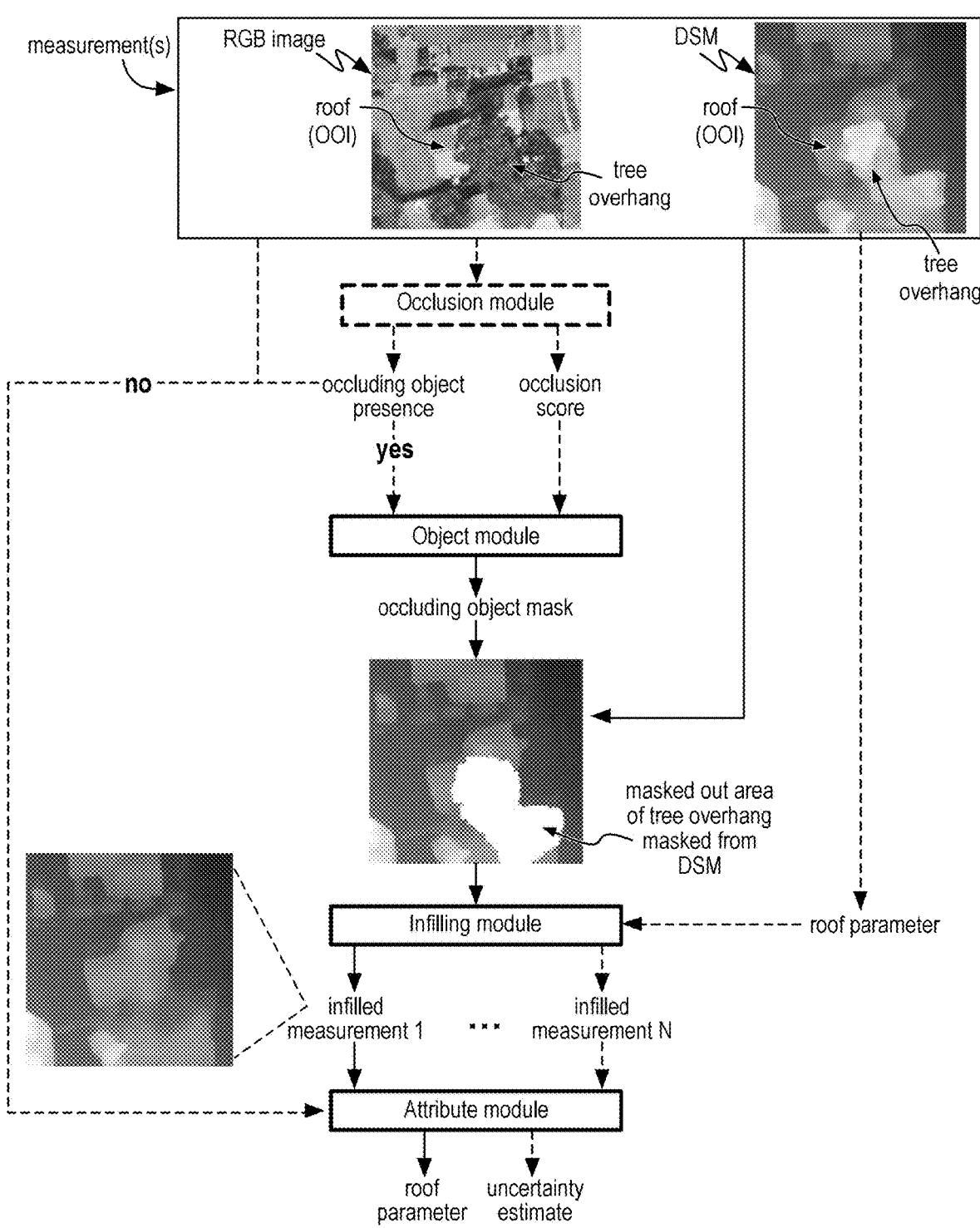
FIG. 10 is an illustrative example of a variant of the method.

In a fourth illustrative example, the method can include: obtaining a DSM depicting an OOI, wherein the OOI is occluded by occluding objects; using the DSM to extract a property attribute and/or component of the OOI; and optionally using the extracted property attribute and/or component for infilling; example shown in FIG. 10.

In a fifth illustrative example, the method can include: generating a 3D model of an OOI (e.g., primary building) and/or a property based on a set of measurements (e.g., RGB images, point clouds, etc.); optionally identifying the position and/or extent of occlusions based on a second set of measurements (e.g., including or excluding measurements from the first set); optionally masking out the occlusions from the 3D OOI model; infilling the occluded portions of the 3D model using the infilling module; and determining attribute values using the infilled 3D model.

However, the method can be otherwise performed.

Different subsystems and/or modules discussed above can be operated and controlled by the same or different entities. In the latter variants, different subsystems can communicate via: APIs (e.g., using API requests and responses, API keys, etc.), requests, and/or other communication channels.

Different processes and/or elements discussed above can be performed and controlled by the same or different entities. In the latter variants, different subsystems can communicate via: APIs (e.g., using API requests and responses, API keys, etc.), requests, and/or other communication channels.

Alternative embodiments implement the above methods and/or processing modules in non-transitory computer-readable media, storing computer-readable instructions that, when executed by a processing system, cause the processing system to perform the method(s) discussed herein. The instructions can be executed by computer-executable components integrated with the computer-readable medium and/or processing system. The computer-readable medium may include any suitable computer readable media such as RAMs, ROMs, flash memory, EEPROMs, optical devices (CD or DVD), hard drives, floppy drives, non-transitory computer readable media, or any suitable device. The computer-executable component can include a computing system and/or processing system (e.g., including one or more collocated or distributed, remote or local processors) connected to the non-transitory computer-readable medium, such as CPUs, GPUs, TPUS, microprocessors, or ASICs, but the instructions can alternatively or additionally be executed by any suitable dedicated hardware device.

Embodiments of the system and/or method can include every combination and permutation of the various elements discussed above, and/or omit one or more of the discussed elements, wherein one or more instances of the method and/or processes described herein can be performed asynchronously (e.g., sequentially), concurrently (e.g., in parallel), or in any other suitable order by and/or using one or more instances of the systems, elements, and/or entities described herein.

As a person skilled in the art will recognize from the previous detailed description and from the figures and claims, modifications and changes can be made to the embodiments of the invention without departing from the scope of this invention defined in the following claims.

We claim:

1. A method for analysis of a property, comprising:
determining a measurement comprising a set of measurement units and depicting a property of interest, wherein the measurement comprises a 3-dimensional (3D) measurement and wherein a measurement unit comprises a voxel;
determining a property segment depicting a roof from the measurement;
infilling an occluded portion of the roof with voxel values to yield an updated property segment;
determining a set of roof parameters, comprising a roof parameter for a subset of measurement units within the updated property segment;
determining a final roof parameter for the roof based on the set of roof parameters.

2. The method of claim 1, wherein the final roof parameter comprises a roof pitch.

3. The method of claim 2, wherein the set of roof parameters comprises a set of pitches, comprising a pitch per measurement unit within the subset of measurement units; wherein the roof pitch is determined based on a distribution of the set of pitches.

4. The method of claim 3, wherein an infilling model is configured to infill the occluded portion of the roof.

5. The method of claim 1, wherein the property segment is determined based on a parcel boundary for the property of interest.

* * * * *